US012636897B2

(12) United States Patent
Misaizu et al.

(10) Patent No.: US 12,636,897 B2
(45) Date of Patent: May 26, 2026

(54) COATING DEVICE, MANUFACTURING SYSTEM, METHOD FOR CONTROLLING COATING DEVICE, AND METHOD FOR ADJUSTING COATING DEVICE

(71) Applicant: MIMAKI ENGINEERING CO., LTD., Nagano (JP)

(72) Inventors: Takuhide Misaizu, Nagano (JP); Hiroyoshi Ohi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 167 days.

(21) Appl. No.: 18/283,203

(22) PCT Filed: Mar. 16, 2022

(86) PCT No.: PCT/JP2022/011830

§ 371 (c)(1),
(2) Date: Sep. 20, 2023

(87) PCT Pub. No.: WO2022/224641

PCT Pub. Date: Oct. 27, 2022

(65) Prior Publication Data

US 2024/0092093 A1 Mar. 21, 2024

(30) Foreign Application Priority Data

Apr. 20, 2021 (JP) ................................ 2021-070875
Apr. 20, 2021 (JP) ................................ 2021-070876

(51) Int. Cl.

*B41J 3/44* (2006.01)
*B05B 12/10* (2006.01)

(Continued)

(52) U.S. Cl.

CPC ................. *B41J 3/44* (2013.01); *B05B 12/10* (2013.01); *B05B 13/04* (2013.01); *B05C 11/10* (2013.01);

(Continued)

(58) Field of Classification Search

CPC ....... B41J 3/44; B41J 2/21; B41J 11/66; B41J 2/2117; B41J 2/211; B41J 2/2114;

(Continued)

(56) References Cited

U.S. PATENT DOCUMENTS

2004/0183840 A1* 9/2004 Ushigome ................ B41J 11/42 347/2
2013/0052332 A1* 2/2013 Roof .................... B41J 11/0024 427/466

(Continued)

FOREIGN PATENT DOCUMENTS

JP 2005268595 9/2005
JP 2014213247 11/2014

(Continued)

OTHER PUBLICATIONS

"International Search Report (Form PCT/ISA/210) of PCT/JP2022/011830", mailed on Jun. 7, 2022, with English translation thereof, pp. 1-8.

(Continued)

*Primary Examiner* — Jason S Uhlenhake
*Assistant Examiner* — Alexander D Shenderov
(74) *Attorney, Agent, or Firm* — JCIPRNET

(57) ABSTRACT

A manufacturing system manufactures a predetermined product by printing and applying a coating agent to a base material made of resin. In a coating device of the manufacturing system, as a nozzle spraying the coating agent moves once in a first direction, a linear coating agent being the coating agent in a line shape with the first direction as a (Continued)

longitudinal direction is applied to the base material. A host control device creates application data for applying the coating agent to the base material by the coating device based on image data as data of an image to be printed on the base material by printing devices, and the application data includes, for applying the linear coating agents to the base material, spray range data of the coating agent from the nozzle in the first direction, and application interval data of the linear coating agents in a second direction.

11 Claims, 9 Drawing Sheets

(51) Int. Cl.

| | |
|---|---|
| ***B05B 13/04*** | (2006.01) |
| ***B05C 11/10*** | (2006.01) |
| ***B41J 2/21*** | (2006.01) |
| ***B41J 11/66*** | (2006.01) |
| ***B41M 7/00*** | (2006.01) |

(52) U.S. Cl.
CPC ................. *B41J 2/21* (2013.01); *B41J 2/211* (2013.01); *B41J 2/2114* (2013.01); *B41J 11/66* (2013.01); *B41M 7/0045* (2013.01); *B41M 7/0081* (2013.01); *B41J 2/2117* (2013.01)

(58) Field of Classification Search
CPC ........ B41J 25/304; B05B 12/10; B05B 13/04; B05B 7/066; B05B 13/0405; B05C 11/10; B41M 7/0045; B41M 7/0081; B26D 5/007; B26D 5/00; B05D 1/26; B05D 3/067
USPC .............................................................. 347/2
See application file for complete search history.

(56) References Cited

U.S. PATENT DOCUMENTS

| | | | | |
|---|---|---|---|---|
| 2014/0150619 | A1* | 6/2014 | Fujihara | B26D 7/26 83/401 |
| 2015/0210088 | A1* | 7/2015 | Grinberg | B41J 11/008 347/5 |
| 2016/0185130 | A1* | 6/2016 | Sugai | B41M 7/0081 347/102 |
| 2021/0008747 | A1* | 1/2021 | Sugiyama | B26D 7/28 |

FOREIGN PATENT DOCUMENTS

| | | |
|---|---|---|
| JP | 2017043088 | 3/2017 |
| WO | 2014021331 | 2/2014 |
| WO | 2014125391 | 8/2014 |

OTHER PUBLICATIONS

“The First Office Action of China Counterpart Application”, issued on Feb. 14, 2026, with English translation thereof, p. 1-p. 14.

* cited by examiner

COATING DEVICE, MANUFACTURING SYSTEM, METHOD FOR CONTROLLING COATING DEVICE, AND METHOD FOR ADJUSTING COATING DEVICE

CROSS-REFERENCE TO RELATED APPLICATION

This application is a 371 application of the International PCT application serial no. PCT/JP2022/011830, filed on Mar. 16, 2022, which claims the priority benefits of Japan Patent Application No. 2021-070876, filed on Apr. 20, 2021, and Japan Patent Application No. 2021-070875, filed on Apr. 20, 2021. The entirety of each of the above-mentioned patent applications is hereby incorporated by reference herein and made a part of this specification.

TECHNICAL FIELD

This invention relates to a manufacturing system that manufactures a predetermined product by performing printing and applying a coating agent to a base material made of resin or the like.

Further, this invention relates to a coating device that applies a coating agent to a base material made of resin or the like. Further, this invention relates to a manufacturing system including the coating device. Further, this invention relates to a control method and an adjustment method for a coating device that applies a coating agent to a base material made of resin or the like.

BACKGROUND ART

Conventionally, a decorative structure, has been known, that includes a base material made of resin or the like, a plurality of protrusions to be formed on one face of the base material, and an overcoat layer covering the protrusions (with reference to, for example, Patent Literature 1). In the decorative structure described in Patent Literature 1, each of the protrusions is formed by, for example, printing a protrusion ink through an inkjet method, and then curing the protrusion ink printed. Further, the overcoat layer is formed by, for example, applying a coating agent through a spray method or the inkjet method, and then curing the coating agent applied.

Further, conventionally, the decorative structure, has been known, that includes the base material made of the resin or the like, the protrusions to be formed on one face of the base material, and the overcoat layer covering the protrusions (with reference to, for example, Patent Literature 1). In the decorative structure described in Patent Literature 1, the overcoat layer is formed by applying the coating agent through the spray method or the inkjet method, and then curing the coating agent applied.

CITATION LIST

Patent Literature

Patent Literature 1: Japanese Unexamined Patent Publication No. 2014-213247

SUMMARY OF INVENTION

Technical Problems

The inventors of this application have developed a manufacturing system that manufactures a predetermined product by performing printing and applying a coating agent to a base material made of resin or the like. The manufacturing system includes printing mechanisms that perform printing on the base material and an application mechanism that applies the coating agent to the base material. The application mechanism, for example, applies the coating agent to the base material to form a coating layer protecting printing performed on a surface of the base material. As described in Patent Literature 1, the spray method and the inkjet method have been conventionally known as methods for applying the coating agent to the base material, but in a case of the inkjet method, as a viscosity of the coating agent increases, the coating agent cannot be ejected from an inkjet head.

In other words, as the viscosity of the coating agent increases, the coating agent cannot be applied to the base material through the inkjet method. Therefore, in a case where the inkjet method is adopted as the method for applying the coating agent to the base material, coating agents available are limited, and versatility of the application mechanism is deteriorated. On the other hand, in a case of the spray method, even when the viscosity of the coating agent increases, the coating agent can be applied to the base material. Therefore, the inventors of this application have adopted a spray method for spraying the coating agent from a nozzle as the method for applying the coating agent to the base material.

In a case where a product is manufactured by the manufacturing system, printing data for performing the printing on the base material by the printing mechanisms, and application data for applying the coating agent to the base material by the application mechanism are required. In other words, in the manufacturing system, it is necessary to create data including at least the printing data and the application data as data for manufacturing the product, but it is preferable that an operation of creating the data be easy for a user.

Accordingly, this invention provides a manufacturing system that manufactures a predetermined product by performing printing and applying a coating agent to a base material made of resin or the like, the system being capable of simplifying an operation of creating data for manufacturing the product by a user.

Further, the inventors of this application have developed a coating device that applies a coating agent to a base material made of resin or the like. The coating device, for example, applies the coating agent to the base material to form the coating layer protecting the printing performed on the surface of the base material. As described in Patent Literature 1, the spray method and the inkjet method have been conventionally known as methods for applying the coating agent to the base material, but in a case of the inkjet method, as a viscosity of the coating agent increases, the coating agent cannot be ejected from an inkjet head.

In other words, as the viscosity of the coating agent increases, the coating agent cannot be applied to the base material through the inkjet method. Therefore, in the case where the inkjet method is adopted as the method for applying the coating agent to the base material, coating agents available are limited, and versatility of the coating device is deteriorated. On the other hand, in a case of the spray method, even when the viscosity of the coating agent increases, the coating agent can be applied to the base material. Therefore, the inventors of this application have adopted a spray method for spraying the coating agent from a nozzle as the method for applying the coating agent to the base material.

However, in a case where the coating agent is applied to the base material through the spray method for spraying the coating agent from the nozzle, it has been clarified according to study of the inventors of this application that it is difficult to form the coating layer on the base material with a desired thickness while suppressing uneven thickness of the coating layer to be formed by the coating agent applied. Specifically, as a temperature of the coating agent to be sprayed from the nozzle varies and the viscosity of the coating agent varies, a spray amount of the coating agent to be sprayed from the nozzle fluctuates, and thus it has been clarified according to the study of the inventors of this application that it is difficult to form the coating layer on the base material with the desired thickness while suppressing the uneven thickness of the coating layer.

Accordingly, this invention provides a coating device that applies a coating agent to a base material, the device being capable of forming a coating layer on the base material with the desired thickness while suppressing uneven thickness of the coating layer to be formed by the coating agent applied even in the case where the coating agent is applied to the base material through the spray method for spraying the coating agent from the nozzle. Further, this invention provides a manufacturing system including such coating device.

Further, this invention provides a control method and a method for adjusting a coating device that applies a coating agent to a base material, the device being capable of forming a coating layer on the base material with the desired thickness while suppressing uneven thickness of the coating layer to be formed by the coating agent applied even in a case where the coating agent is applied to the base material through the spray method for spraying the coating agent from the nozzle.

Solutions to Problems

In order to solve the problems described above, the manufacturing system of this invention includes printing mechanisms that perform printing on a base material, an application mechanism that applies a coating agent to the base material, and a host control device that creates data for controlling the printing mechanisms and the application mechanism, in which in a case where a predetermined direction orthogonal to an up-down direction is made as a first direction and a direction orthogonal to the up-down direction and the first direction is made as a second direction, the application mechanism includes a nozzle that sprays the coating agent toward the base material downward, a table on which the base material is placed, a carriage on which the nozzle is mounted, a first moving mechanism that reciprocates the carriage relative to the table in the first direction, and a second moving mechanism that reciprocates the carriage relative to the table in the second direction, as the nozzle that sprays the coating agent moves once relative to the table in the first direction by the first moving mechanism, a linear coating agent being the coating agent in a line shape with the first direction as a longitudinal direction is applied to the base material, and a coating layer is formed on the base material by a plurality of the linear coating agents to be applied at a certain interval in the second direction, and the host control device creates application data for applying the coating agent to the base material by the application mechanism based on image data being data of an image to be printed on the base material by the printing mechanisms, the application data including, for applying the linear coating agents to the base material, spray range data of the coating agent from the nozzle in the first direction, and application interval data of the linear coating agents in the second direction.

In the manufacturing system of this invention, the host control device creates the application data for applying the coating agent to the base material by the application mechanism based on the image data being the data of the image to be printed on the base material by the printing mechanisms, the application data including, for applying the linear coating agents to the base material, the spray range data of the coating agent from the nozzle in the first direction, and the application interval data of the linear coating agents in the second direction. In other words, in this invention, the host control device automatically creates the application data based on the image data, and the user does not need to create the application data. Therefore, in the manufacturing system of this invention, it is possible to simplify the operation of creating data for manufacturing the product by the user.

In this invention, the host control device can be input with the thickness of the base material, and the host control device preferably creates the application data based on the thickness of the base material and the image data input to the host control device. Since a distance between the base material and the nozzle varies depending on the thickness of the base material, as the thickness of the base material changes, a width of each of the linear coating agents in the second direction may vary, and an application interval appropriate for the each of the linear coating agents in the second direction may vary, but with such configuration, it is possible to create the application data appropriate in the host control device even when the thickness of the base material changes.

In this invention, a type of the nozzle is selectable in the host control device, and the host control device preferably creates the application data based on the type of the nozzle selected and the image data. The width of the each of the linear coating agents in the second direction may vary, and the application interval appropriate for the each of the linear coating agents in the second direction may vary depending on the type of the nozzle, but with such configuration, it is possible to create the application data appropriate in the host control device even when the type of the nozzle changes.

In this invention, as a moving speed of the carriage in the first direction becomes constant, the nozzle starts to spray the coating agent, the host control device can be input with an application misalignment correction value for correcting a first direction misalignment between a spray position of the coating agent from the nozzle in the first direction and an application position of the coating agent to the base material in the first direction, and the host control device preferably creates the application data based on the application misalignment correction value and the image data input to the host control device.

With such configuration, since the nozzle starts to spray the coating agent when the moving speed of the carriage in the first direction becomes constant, it is possible to suppress uneven thickness of the each of the linear coating agents to be applied in the first direction. Further, as the nozzle sprays the coating agent while the carriage is moving in the first direction, the spray position of the coating agent from the nozzle in the first direction and the application position of the coating agent to the base material in the first direction misaligned from each other in the first direction. However, with such configuration, the host control device creates the application data based on the application misalignment correction value for correcting the misalignment between the spray position of the coating agent from the nozzle in the first direction and the application position of the coating agent to the base material in the first direction and the image data, and thus it is possible to suppress a misalignment in the application position of the each of the linear coating agents in the first direction.

This invention may be configured such that, for example, the printing mechanisms and the application mechanism are separate devices, and the number of the application mechanism is less than the number of the printing mechanisms.

This invention may be configured to such that, for example, the printing mechanisms and the application mechanism are separate devices, the application mechanism applies the coating agent to the base material after being printed by the printing mechanisms, and the printing mechanisms print position alignment marks for performing position alignment on the base material in the application mechanism on the base material. In this case, even when the printing mechanisms and the application mechanism are separate devices, it is possible to perform the position alignment on the base material in the application mechanism by using the position alignment marks. Accordingly, it is possible to suppress a misalignment between a printed part of the base material and a part of the base material to which the coating agent to be applied.

This invention may be configured such that, for example, the printing mechanisms perform the printing on the base material with a plurality of colors of ink, and the application mechanism applies the coating agent which is monochromatic or transparent to the base material. Further, this invention may be configured such that, for example, the printing mechanisms perform the printing on the base material with an ultraviolet-curable ink, and the application mechanism applies an ultraviolet-curable coating agent to the base material.

In this invention, the manufacturing system includes a cutting mechanism that cuts the base material with the coating agent cured into a predetermined shape, and the host control device preferably creates cutting data for cutting the base material with the cutting mechanism based on the image data. With such configuration, the host control device automatically creates the cutting data based on the image data, and the user does not need to create the cutting data. Accordingly, even in a case where the base material with the coating agent cured is cut into the predetermined shape by the cutting mechanism, it is possible to simplify the operation of creating the data for manufacturing the product by the user.

In this invention, the host control device preferably creates the application data based on the cutting data. With such configuration, it is possible to simplify data creation processing in the host control device as compared to a case where the application data is created without using the cutting data in the host control device.

Further, in order to solve the problems above, the coating device of this invention is a coating device that applies a coating agent to a base material, the device including a nozzle that sprays the coating agent toward the base material, a coating agent storing part that stores the coating agent to be supplied to the nozzle, a temperature sensor that detects a temperature of the coating agent to be supplied to the nozzle from the coating agent storing part, a pressure adjustment mechanism that adjusts a supplying pressure of the coating agent to be supplied to the nozzle from the coating agent storing part, and a controller that receives an output signal of the temperature sensor and controls the pressure adjustment mechanism, in which the controller stores supplying pressure information in which the supplying pressure of the coating agent is associated with each temperature to make a spray amount of the coating agent from the nozzle per unit time constant even under different temperatures, and the controller controls the pressure adjustment mechanism to make the supplying pressure of the coating agent to be supplied to the nozzle from the coating agent storing part a supplying pressure at which the spray amount of the coating agent from the nozzle per unit time becomes constant based on the temperature of the coating agent to be detected by the temperature sensor and the supplying pressure information.

In the coating device of this invention, the controller stores the supplying pressure information in which the supplying pressure of the coating agent is associated with the each temperature to make the spray amount of the coating agent from the nozzle per unit time constant even under different temperatures, and the controller controls the pressure adjustment mechanism to make the supplying pressure of the coating agent to be supplied to the nozzle from the coating agent storing part the supplying pressure at which the spray amount of the coating agent from the nozzle per unit time becomes constant based on the temperature of the coating agent to be detected by the temperature sensor and the supplying pressure information.

Therefore, in this invention, even when the temperature of the coating agent varies and the viscosity of the coating agent varies, it is possible to suppress fluctuation of the spray amount of the coating agent to be sprayed from the nozzle per unit time. Accordingly, in this invention, even in the case where the coating agent is applied to the base material through the spray method for spraying the coating agent from the nozzle, it is possible to form the coating layer on the base material with the desired thickness while suppressing the uneven thickness of the coating layer to be formed by the coating agent applied. Further, in this invention, since the supplying pressure of the coating agent is automatically adjusted, it is possible to form the coating layer on the base material with the desired thickness while suppressing the uneven thickness of the coating layer easily.

Note that, a flow rate sensor that detects a flow rate of the coating agent to be supplied to the nozzle from the coating agent storing part is installed, and the controller controls the pressure adjustment mechanism to make the supplying pressure at which the spray amount of the coating agent from the nozzle per unit time becomes constant based on results detected by the flow rate sensor, and thus it is also possible to suppress the fluctuation of the spray amount of the coating agent to be sprayed from the nozzle per unit time when the viscosity of the coating agent varies. However, since the flow rate sensor that detects the flow rate of the coating agent is very expensive, in this case, cost of the coating device increases. In contrast, in this invention, it is possible to suppress the fluctuation of the spray amount of the coating agent to be sprayed from the nozzle per unit time when the viscosity of the coating agent varies by using a relatively inexpensive temperature sensor, and thus the cost of the coating device can be reduced.

In this invention, the controller preferably stores the supplying pressure information for each type of coating agent to be used in the coating device. Although the viscosity of the coating agent may be different depending on the type of the coating agent, with such configuration, the controller can, based on the temperature of the coating agent to be detected by the temperature sensor and the supplying pressure information depending on the type of the coating agent to be used in the coating device, control the pressure adjustment mechanism to make the supplying pressure of the coating agent to be supplied to the nozzle from the coating agent storing part becomes the supplying pressure at which the spray amount of the coating agent from the nozzle per unit time becomes constant. Accordingly, even when the type of the coating agent to be used in the coating device changes, it is possible to form the coating layer on the base material with the desired thickness while suppressing the uneven thickness of the coating layer.

In this invention, the controller preferably stores the supplying pressure information for each type of the base material to be used in the coating device. Ease of spreading of the coating agent on the surface of the base material may be different depending on the type of the base material, and in a case where the ease of spreading of the coating agent on the surface of the base material becomes different, it may be difficult to form the coating layer on the base material with the desired thickness. However, with such configuration, the controller can control the pressure adjustment mechanism based on the temperature of the coating agent to be detected by the temperature sensor and the supplying pressure information depending on the type of the base material on which the coating layer is formed. Accordingly, even when the type of the base material to be used in the coating device changes, it is possible to form the coating layer on the base material with the desired thickness. For example, since a contact angle is relatively large depending on the base material, the coating agent is less likely to spread, and the coating layer is formed thicker than intended, or conversely, since the contact angle is relatively small, the coating agent spreads too much, and the coating layer is formed thinner than intended. In contrast, as long as the supplying pressure information is stored for the each type of the base material, more appropriate control becomes possible, and it is possible to easily form a coating layer having a film thickness desired by the user on the base material.

In this invention, it is preferable that the coating device includes the carriage on which the nozzle is mounted, and the temperature sensor is mounted on the carriage. With such configuration, it is possible to detect the temperature of the coating agent by the temperature sensor at a position closer to the nozzle that sprays the coating agent. Accordingly, the controller can control the pressure adjustment mechanism based on the temperature of the coating agent to be detected at the position closer to the nozzle, and as a result, it is possible to effectively suppress the fluctuation of the spray amount of the coating agent to be sprayed from the nozzle per unit time.

In this invention, for example, the viscosity of the coating agent in the coating agent storing part is 15 to 150 mPa#s, and the supplying pressure of the coating agent included in the supplying pressure information is 0.05 to 0.4 MPa. According to the study of the inventors of this application, in this case, it is possible to form a coating layer having a thickness of 10 to 40 lam on the base material. Further, according to the study of the inventors of this application, in a case where the thickness of the coating layer is 10 to 40 μm, it is possible to reduce occurrence frequency of cracks in the coating layer.

Note that, in a case where the coating agent has a viscosity of more than 15 mPa·s, it is difficult for a nozzle of the inkjet head to eject the coating agent, but even for such coating agent, the coating agent can be ejected and applied to the base material by using the coating device of this invention. Further, in a case where the coating agent having a viscosity of about 100 mPa·s or less is used, the coating layer can be easily formed. However, in a case where the coating agent having a viscosity of 150 mPa·s or more is used, since it is difficult to form a coating layer with an intended thickness only by control with the controller and the pressure adjustment mechanism included in the coating device of this invention, for example, manual adjustment by a user is required, and as a result, convenience is impaired. Accordingly, the viscosity of the coating agent to be used is preferably 15 to 150 mPa·s. Further, the viscosity of the coating agent to be used is more preferably 20 to 120 mPa·s, and still more preferably 25 to 100 mPa·s.

In this invention, in the case where the predetermined direction orthogonal to the up-down direction is made as the first direction and the direction orthogonal to the up-down direction and the first direction is made as the second direction, the coating device includes the table on which the base material is placed, the carriage on which the nozzle is mounted, a carriage holding member that movably holds the carriage, the first moving mechanism that reciprocates the carriage relative to the carriage holding member in the first direction, and the second moving mechanism that reciprocates the carriage holding member relative to the table in the second direction, in which as the nozzle that sprays the coating agent moves once together with the carriage in the first direction, a strip-shaped coating agent being the coating agent in a strip shape elongated in the first direction is applied to the base material, and the second moving mechanism preferably moves the carriage holding member relative to the table in the second direction by a distance shorter than a width of the strip-shaped coating agent in the second direction before the strip-shaped coating agent next is applied to the base material. With such configuration, it is possible to suppress the thickness of the coating layer to be thin at a boundary between the strip-shaped coating agent and the strip-shaped coating agent. Accordingly, it is possible to effectively suppress the uneven thickness of the coating layer to be formed on the base material.

In this invention, it is preferable that the second moving mechanism moves the carriage holding member relative to the table in the second direction by a distance substantially half of the width of the strip-shaped coating agent in the second direction before the strip-shaped coating agent next is applied to the base material. According to the study of the inventors of this application, with such configuration, it is possible to more effectively suppress the uneven thickness of the coating layer to be formed on the base material.

In this invention, the nozzle is preferably an external mixing two-fluid nozzle that externally mixes and sprays the coating agent and compressed air. With such configuration, it is possible to form a coating layer having a thickness that is relatively thinner on the base material. Further, with such configuration, since scattering of the coating agent to be sprayed from the nozzle is easily suppressed as compared with a case where the nozzle is an internal mixing two-fluid nozzle that internally mixes and sprays the coating agent and the compressed air, it is possible to apply a certain amount of the coating agent to an intended position on the base material. Accordingly, it is possible to effectively suppress the uneven thickness of the coating layer to be formed on the base material.

The coating device of this invention can be used for the manufacturing system that includes printing devices that perform printing on the base material with no coating agent applied, a curing device that cures the coating agent applied to the base material, and a cutting device that cuts the base material with the coating agent cured into a predetermined shape, and manufactures a predetermined product. In the manufacturing system, even in the case where the coating agent is applied to the base material through the spray method for spraying the coating agent from the nozzle, it is possible to form the coating layer on the base material with the desired thickness while suppressing the uneven thickness of the coating layer to be formed by the coating agent applied.

Further, in order to solve the problems above, the method for controlling the coating device of this invention is a method for controlling the coating device that applies a coating agent to a base material, the device including a nozzle that sprays the coating agent toward the base material, a coating agent storing part that stores the coating agent to be supplied to the nozzle, a temperature sensor that detects a temperature of the coating agent to be supplied to the nozzle from the coating agent storing part, and a pressure adjustment mechanism that adjusts a supplying pressure of the coating agent to be supplied to the nozzle from the coating agent storing part. The control method includes storing supplying pressure information in which the supplying pressure of the coating agent is associated with each temperature to make the spray amount of the coating agent from the nozzle per unit time constant even under different temperatures, and controlling the pressure adjustment mechanism, based on the temperature of the coating agent to be detected by the temperature sensor and the supplying pressure information, to make the supplying pressure of the coating agent to be supplied to the nozzle from the coating agent storing part become a supplying pressure at which the spray amount of the coating agent from the nozzle per unit time becomes constant.

In the method for controlling the coating device of this invention, the supplying pressure information in which the supplying pressure of the coating agent is associated with the each temperature is stored to make the spray amount of the coating agent from the nozzle per unit time constant even under different temperatures, and the pressure adjustment mechanism is controlled, based on the temperature of the coating agent to be detected by the temperature sensor and the supplying pressure information, to make the supplying pressure of the coating agent to be supplied to the nozzle from the coating agent storing part become the supplying pressure at which the spray amount of the coating agent from the nozzle per unit time becomes constant.

Therefore, in this invention, even when the temperature of the coating agent varies and the viscosity of the coating agent varies, it is possible to suppress fluctuation of the spray amount of the coating agent to be sprayed from the nozzle per unit time. Accordingly, as long as the coating device is controlled through the control method for this invention, even in the case where the coating agent is applied to the base material through the spray method for spraying the coating agent from the nozzle, it is possible to form the coating layer on the base material with the desired thickness while suppressing the uneven thickness of the coating layer to be formed by the coating agent applied. Further, in this invention, since the supplying pressure of the coating agent is automatically adjusted, it is possible to form the coating layer on the base material with the desired thickness while suppressing the uneven thickness of the coating layer easily.

Moreover, in order to solve the problems above, the method for adjusting the coating device of this invention is a method for adjusting the coating device that applies a coating agent to a base material, the device including a nozzle that sprays the coating agent toward the base material, a coating agent storing part that stores the coating agent to be supplied to the nozzle, a temperature sensor that detects a temperature of the coating agent to be supplied to the nozzle from the coating agent storing part, and a pressure adjustment mechanism that adjusts a supplying pressure of the coating agent to be supplied to the nozzle from the coating agent storing part. The adjustment method includes specifying supplying pressure information in which the supplying pressure of the coating agent is associated with each temperature to make the spray amount of the coating agent from the nozzle per unit time constant even under different temperatures, and adjusting the pressure adjustment mechanism to make the supplying pressure of the coating agent to be supplied to the nozzle from the coating agent storing part a supplying pressure at which the spray amount of the coating agent from the nozzle per unit time become constant based on the temperature of the coating agent to be detected by the temperature sensor and the supplying pressure information.

In the adjustment method for the coating device of this invention, the supplying pressure information in which the supplying pressure of the coating agent is associated with the each temperature is specified to make the spray amount of the coating agent from the nozzle per unit time constant even under different temperatures, and the pressure adjustment mechanism is adjusted to make the supplying pressure of the coating agent to be supplied to the nozzle from the coating agent storing part the supplying pressure at which the spray amount of the coating agent from the nozzle per unit time becomes constant based on the temperature of the coating agent to be detected by the temperature sensor and the supplying pressure information.

Therefore, in this invention, even when the temperature of the coating agent varies and the viscosity of the coating agent varies, it is possible to suppress fluctuation of the spray amount of the coating agent to be sprayed from the nozzle per unit time. Accordingly, as long as the coating device is adjusted through the adjustment method for this invention, even in the case where the coating agent is applied to the base material through the spray method for spraying the coating agent from the nozzle, it is possible to form the coating layer on the base material with the desired thickness while suppressing the uneven thickness of the coating layer to be formed by the coating agent applied.

Effect of the Invention

As described above, this invention can simplify the operation of creating the data for manufacturing the predetermined product by the user in the manufacturing system that manufactures the product by performing the printing and applying the coating agent to the base material made of the resin or the like.

Further, as described above, in this invention, it is possible to form the coating layer on the base material with the desired thickness while suppressing the uneven thickness of the coating layer to be formed by the coating agent applied, even in the case where the coating agent is applied to the base material through the spray method for spraying the coating agent from the nozzle in the coating device that applies the coating agent to the base material.

DESCRIPTION OF EMBODIMENTS

First Invention

Hereinafter, embodiments of this invention will be described with reference to drawings.

Schematic Configuration of Manufacturing System

Figure 1:
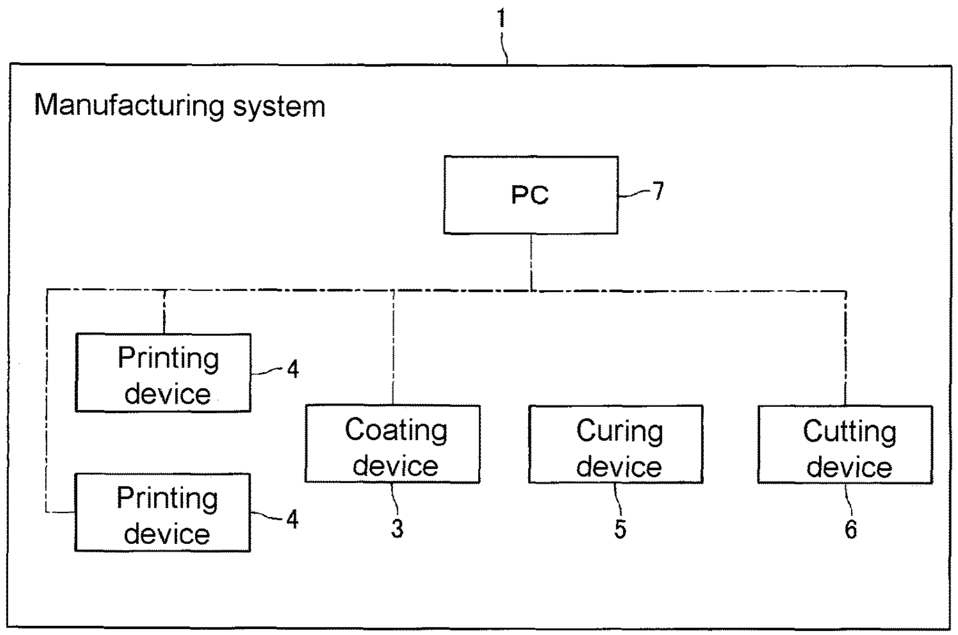
FIG. 1 is a block diagram of a manufacturing system according to one embodiment of this invention.

FIG. 1 is a block diagram of a manufacturing system 1 according to one embodiment of this invention.

Figure 2:
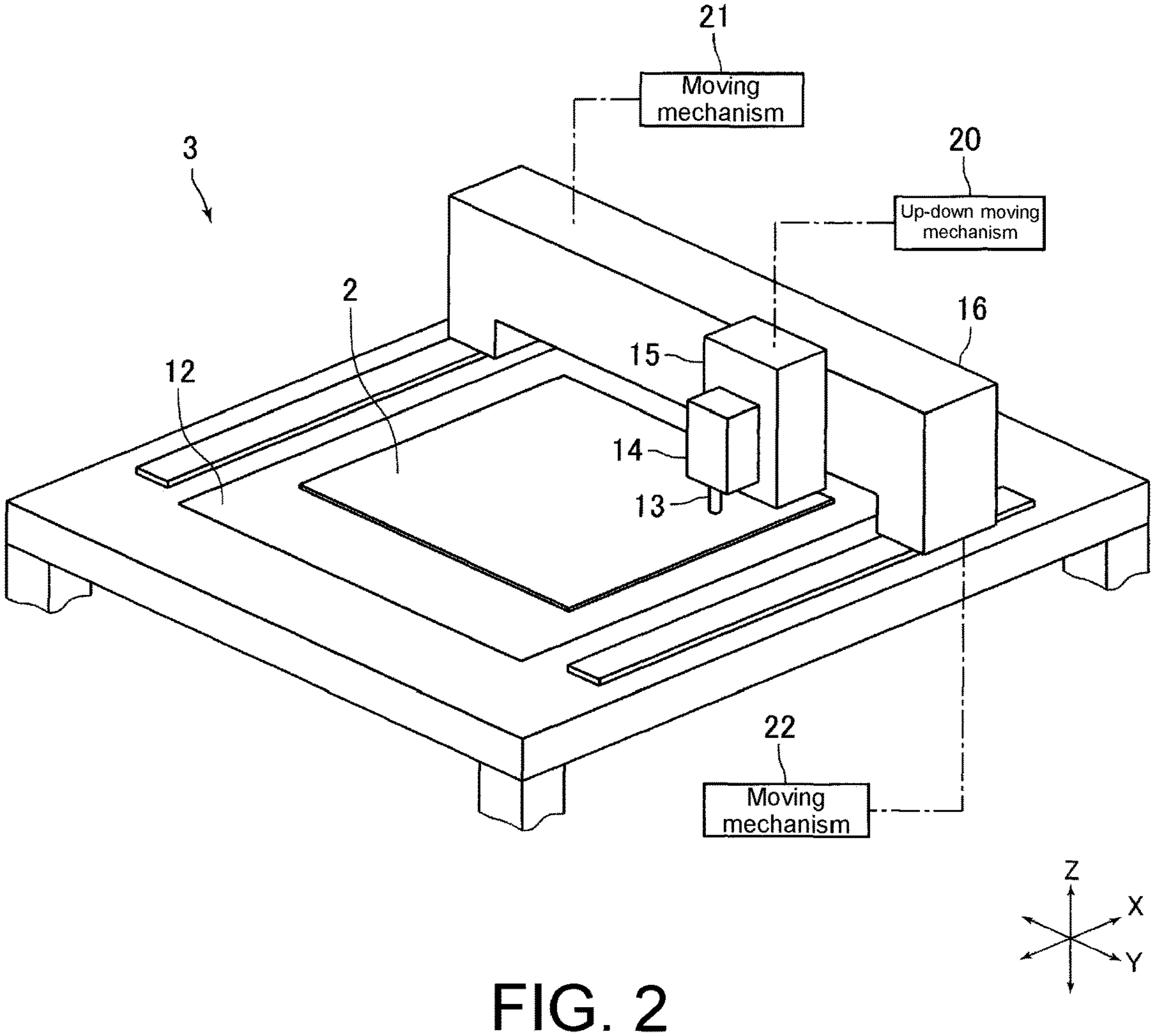
FIG. 2 is a view for illustrating a configuration of a coating device illustrated in FIG. 1.

The manufacturing system 1 of this embodiment is a system that manufactures a predetermined product by using a base material 2 (with reference to FIG. 2). In the manufacturing system 1, for example, a key holder plate to be used in a key holder is manufactured. The base material 2 is made of various materials such as resin, metal, glass, paper, or fabric. The base material 2 of this embodiment is made of a hard resin such as an acrylic resin or an ABS resin. Further, the base material 2 of this embodiment is formed in a planar shape.

The manufacturing system 1 includes a coating device 3 as an application mechanism that applies a coating agent to the base material 2, printing devices 4 as printing mechanisms that perform printing on the base material 2, a curing device 5 that cures the coating agent applied to the base material 2, a cutting device 6 as a cutting mechanism that cuts the base material 2 with the coating agent cured into a predetermined shape, and a personal computer (PC) 7 as a host control device to which the coating device 3, the printing devices 4, and the cutting device 6 are electrically connected. In this embodiment, the printing devices 4 perform the printing on the base material 2 with no coating agent applied by the coating device 3. In other words, the coating device 3 applies the coating agent to the base material 2 after being printed by the printing devices 4. Further, in this embodiment, the coating device 3, the printing devices 4, the curing device 5, and the cutting device 6 are separate devices.

The printing devices 4 are inkjet printers. Each of the printing devices 4 includes, for example, an inkjet head that ejects ink toward the base material 2, a carriage on which the inkjet head is mounted, a carriage drive mechanism that moves the carriage in a main scanning direction, a table on which the base material 2 is placed, and a moving mechanism that moves the carriage relative to the table in a sub scanning direction. Further, each of the printing devices 4 includes a controller that controls the printing device 4. The controller is electrically connected to the PC 7, and controls the printing devices 4 based on a control command from the PC 7. The printing devices 4 perform the printing on the base material 2 with a plurality of colors of ink. Further, the printing devices 4 perform the printing on the base material 2 with an ultraviolet-curable ink.

Note that, in the printing devices 4, it is possible to use various kinds of ink including aqueous ink (water-based ink) such as aqueous pigment ink, latex ink, and pigment-containing resin-dispersed ink, evaporation dryable ink such as solvent ink (solution ink) using an organic solvent as a solvent, ultraviolet-curable ink (UV ink), and energy ray curable ink such as solvent-added UV ink (solvent UV ink and SUV ink). However, since the ultraviolet-curable ink is suitably applied to the base material 2 made of the resin, the ink to be used in the printing devices 4 is preferably the ultraviolet-curable ink. Further, the ink to be used in the printing devices 4 is more preferably an ultraviolet-curable ink to be radically polymerized or cationically polymerized.

Further, in a case where the base material 2 is the acrylic resin, the ink to be used in the printing devices 4 is preferably ink using an acrylic monofunctional or polyfunctional monomer or oligomer. Further, in a case where the coating agent to be applied by the coating device 3 is an acrylic coating agent, the ink to be used in the printing devices 4 is more preferably an ink having a high proportion of the polyfunctional monomer and oligomer. Examples of the ink having the high proportion of the polyfunctional monomer and oligomer include ultraviolet-curable ink such as LH-100 and LUS-120 manufactured by MIMAKI ENGINEERING CO., LTD.

The cutting device 6 is a laser cutter that cuts the base material 2 with laser light. The cutting device 6 includes, for example, a laser light emitting section that emits the laser light toward the base material 2, a table on which the base material 2 is placed, and a moving mechanism that moves the laser light-emitting unit relative to the table in two directions orthogonal to the up-down direction (a vertical direction) and orthogonal to each other. Further, the cutting device 6 includes a controller that controls the cutting device 6. The controller is electrically connected to the PC 7, and controls the cutting device 6 based on a control command from the PC 7. Further, the cutting device 6 includes an optical detection mechanism (not illustrated) that detects position alignment marks M to be described later to be printed on the base material 2. Note that, the cutting device 6 may cut the base material 2 with a cutter blade. In this case, the cutting device 6 includes the cutter blade instead of the laser light emitting section.

The coating device 3 applies the coating agent on at least the printing performed on the base material 2 to protect the printing performed on the base material 2 by the printing devices 4. The coating device 3 applies the monochromatic coating agent to the base material 2. In this embodiment, the coating device 3 applies the transparent coating agent to the base material 2. Further, the coating device 3 applies the ultraviolet-curable coating agent to the base material 2. For example, the coating device 3 applies the ultraviolet-curable coating agent to be radically polymerized or cationically polymerized to the base material 2. Further, in a case where the base material 2 is made of the acrylic resin, the coating device 3 applies the acrylic coating agent. A more specific configuration of the coating device 3 will be described later.

The curing device 5 includes an ultraviolet irradiator that irradiates the coating agent applied to the base material 2 with an ultraviolet ray. The ultraviolet irradiator irradiates the base material 2 to which the coating agent is applied with the ultraviolet ray from above. The coating agent cured by the curing device 5 becomes the coating layer. In other words, as the coating agent applied to the base material 2 is irradiated with the ultraviolet ray, the coating layer is formed on the base material 2. The thickness of the coating layer to be formed on the base material 2 becomes 10 to 40 μm. In this embodiment, the coating layer having a relatively high hardness is formed on the base material 2.

Time required for applying the coating agent to one base material 2 by one coating device 3 becomes less than or equal to half of time required for performing the printing on one base material 2 by one printing device 4. Therefore, for example, as illustrated in FIG. 1, the manufacturing system 1 of this embodiment includes two printing devices 4, one coating device 3, one curing device 5, and one cutting device 6, and the base material 2 on which the printing is performed by the two printing devices 4 is supplied to one coating device 3. In other words, in the manufacturing system 1, the number of the coating device 3 is less than the number of the printing devices 4.

Configuration of Coating Device

Figure 3:
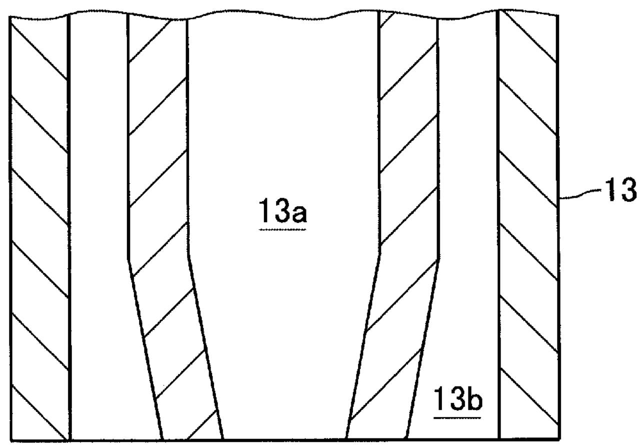
FIG. 3 is a cross-sectional view for illustrating a configuration of a nozzle illustrated in FIG. 2.

FIG. 2 is a view for illustrating the configuration of the coating device 3 illustrated in FIG. 1. FIG. 3 is a cross-sectional view for illustrating a configuration of a nozzle 13 illustrated in FIG. 2.

The coating device 3 includes a table 12 on which the base material 2 is placed, the nozzle 13 that sprays the coating agent toward the base material 2 downward, an application head 14 to which the nozzle 13 is attached, a carriage 15 on which the nozzle 13 and the application head 14 are mounted, and a Y bar 16 that movably holds the carriage 15. Further, the coating device 3 includes a controller that controls the coating device 3. The controller is electrically connected to the PC 7, and controls the coating device 3 based on a control command from the PC 7. The coating device 3 applies the coating agent to the base material 2 through a spray method for spraying the coating agent from the nozzle 13. In descriptions below, a Y direction in FIG. 2 orthogonal to the up-down direction (a Z direction in FIG. 2) is made as a left-right direction, and an X direction in FIG. 2 orthogonal to the up-down direction and the left-right direction is made as a front-back direction.

The application head 14 is held by the carriage 15 to be able to reciprocate in the up-down direction relative to the carriage 15. The Y bar 16 is formed in a substantially rectangular parallelepiped shape elongated in the left-right direction. The carriage 15 is held by the Y bar 16 to be able to reciprocate in the left-right direction relative to the Y bar 16. The nozzle 13, the application head 14, the carriage 15, and the Y bar 16 are disposed on an upper side of the table 12. The Y bar 16 is movable relative to the table 12 in the front-back direction.

The coating device 3 includes an up-down moving mechanism 20 that moves the application head 14 up and down relative to the carriage 15. Further, the coating device 3 further includes a moving mechanism 21 that reciprocates the carriage 15 relative to the Y bar 16 in the left-right direction, and a moving mechanism 22 that reciprocates the Y bar 16 relative to the table 12 in the front-back direction. In other words, the coating device 3 includes the moving mechanism 21 that reciprocates the carriage 15 relative to the table 12 in the left-right direction, and the moving mechanism 22 that reciprocates the carriage 15 relative to the table 12 in the front-back direction. The left-right direction (the Y direction) of this embodiment is the first direction being the predetermined direction orthogonal to the up-down direction, and the front-back direction (the X direction) is the second direction being the direction orthogonal to the up-down direction and the first direction. Further, the moving mechanism 21 of this embodiment is the first moving mechanism, and the moving mechanism 22 is the second moving mechanism.

Further, the coating device 3 includes a laser pointer (not illustrated) for performing position alignment on the base material 2 placed on the table 12. The laser pointer is mounted on the carriage 15. The up-down moving mechanism 20 includes a drive source such as a motor, and a power transmission mechanism such as a ball screw that transmits power of the drive source to the application head 14. The moving mechanism 21 includes a drive source such as a motor, and a power transmission mechanism such as a pulley and a belt for transmitting power of the drive source to the carriage 15. The moving mechanism 22 includes a drive source such as a motor, and a power transmission mechanism such as a ball screw that transmits power of the drive source to the Y bar 16.

The nozzle 13 is an external mixing two-fluid nozzle that externally mixes and sprays the coating agent and the compressed air. As illustrated in FIG. 3, a supply path 13*a* for the coating agent and a supply path 13*b* for the compressed air are formed inside the nozzle 13. The supply path 13*b* is formed in, for example, an annular shape surrounding the supply path 13*a*. A compressed air supply source (not illustrated) such as a compressor that supplies the compressed air is connected to the supply path 13*b*. The nozzle 13 is detachably attached to the application head 14. In this embodiment, as the nozzle 13, it is possible to use various nozzles such as a round nozzle 13 with a spray port in a circular shape, and a flat nozzle 13 with a spray port in an oval shape or an elliptical shape.

A distance (a gap) between an upper face of the base material 2 to be placed on the table 12 and a lower end face of the nozzle 13 in the up-down direction is set to 2 to 30 mm. However, the distance between the upper face of the base material 2 and the lower end face of the nozzle 13 is preferably set to 5 to 20 mm. The nozzle 13 starts to spray the coating agent as a moving speed (specifically, a moving speed in the left-right direction) of the carriage 15 becomes constant after the carriage 15 that has been stopped starts to move. In other words, after the nozzle 13 that has been stopped starts to move together with the carriage 15, in a case where a moving speed of the nozzle 13 becomes constant, the nozzle 13 starts to spray the coating agent. The viscosity of the coating agent to be supplied to the nozzle 13 becomes 15 to 150 mPa.

In order to secure the thickness (the film thickness) of the coating layer to be formed on the base material 2, the spray amount of the coating agent to be sprayed from the nozzle 13 per unit time is 0.1 ml/min or more. However, the spray amount of the coating agent to be sprayed from the nozzle 13 per unit time is preferably 0.5 ml/min or more, and more preferably 1.0 ml/min or more. Further, in order to minimize protrusion of the coating agent, the spray amount of the coating agent to be sprayed from the nozzle 13 per unit time is 30 ml/min or less. However, the spray amount of the coating agent to be sprayed from the nozzle 13 per unit time is preferably 10 ml/min or less, and more preferably 5 ml/min or less.

In the coating device 3, as the nozzle 13 that sprays the coating agent moves once in the left-right direction relative to the table 12 by the moving mechanism 21 together with the carriage 15, a linear coating agent being the coating agent in a line shape with the left-right direction as the longitudinal direction is applied to the base material 2. The linear coating agent is applied at a position misaligned in the front-back direction relative to the linear coating agent applied immediately before. In this embodiment, the coating layer is formed on the base material 2 by a plurality of the linear coating agents to be applied at a certain interval in the front-back direction. The width of the each of the linear coating agents in the front-back direction is 1 mm to 30 mm. However, the width of the each of the linear coating agents in the front-back direction is preferably 5 mm to 20 mm.

Note that, the spray amount of the coating agent to be sprayed from the nozzle 13 per unit time varies depending on the viscosity of the coating agent to be sprayed from the nozzle 13 as long as a supplying pressure of the coating agent to the nozzle 13 is constant. Further, the viscosity of the coating agent to be sprayed from the nozzle 13 varies depending on the temperature of the coating agent to be sprayed from the nozzle 13. In other words, the spray amount of the coating agent to be sprayed from the nozzle 13 per unit time varies depending on the temperature of the coating agent to be sprayed from the nozzle 13 as long as the supplying pressure of the coating agent to the nozzle 13 is constant. In this embodiment, regardless of the temperature of the coating agent to be sprayed from the nozzle 13, the supplying pressure of the coating agent to be supplied to the nozzle 13 is controlled, based on the results detected by the temperature sensor that measures the temperature of the coating agent and a database stored in advance in the PC 7, to make the spray amount of the coating agent to be sprayed from the nozzle 13 per unit time constant.

Creation Method for Image Data, Application Data, and Cutting Data

Figure 4:
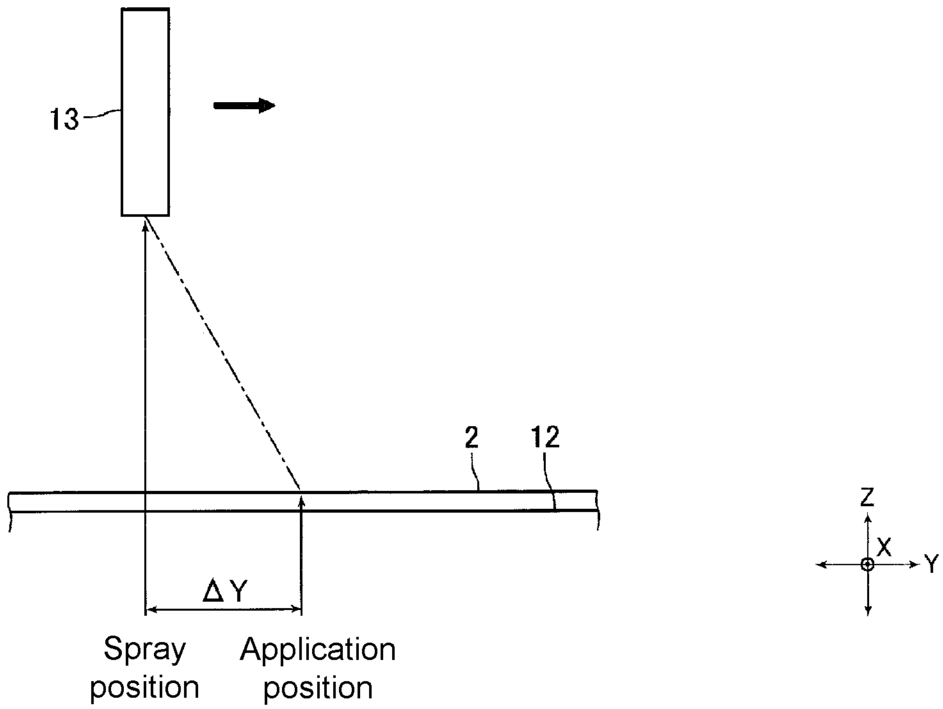
FIG. 4 is a view for illustrating that when a coating agent is applied by the coating device illustrated in FIG. 2, a first direction misalignment occurs between a spray position of the coating agent from the nozzle in the first direction and an application position of the coating agent on a base material in the first direction.
Figure 5:
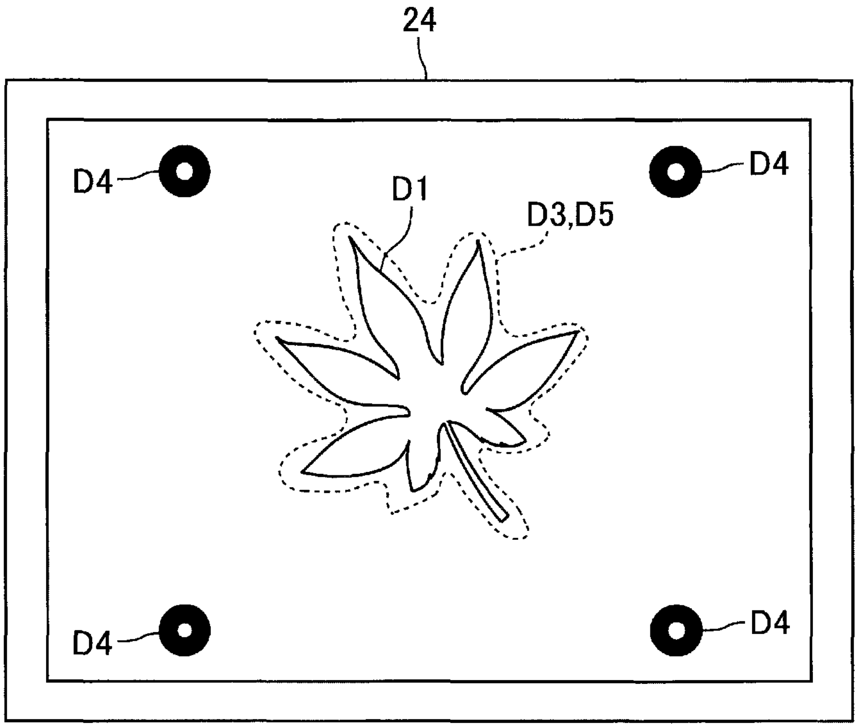
FIG. 5 is a view illustrating an example of display on a display included in a host control device illustrated in FIG. 1.
Figure 6:
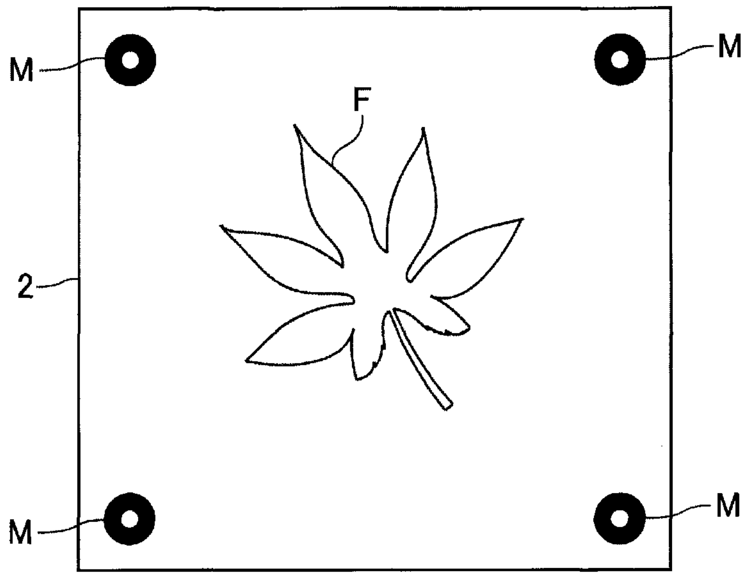
FIG. 6 is a view illustrating an example of an image or the like printed on a base material by printing devices illustrated in FIG. 1.
Figure 7:
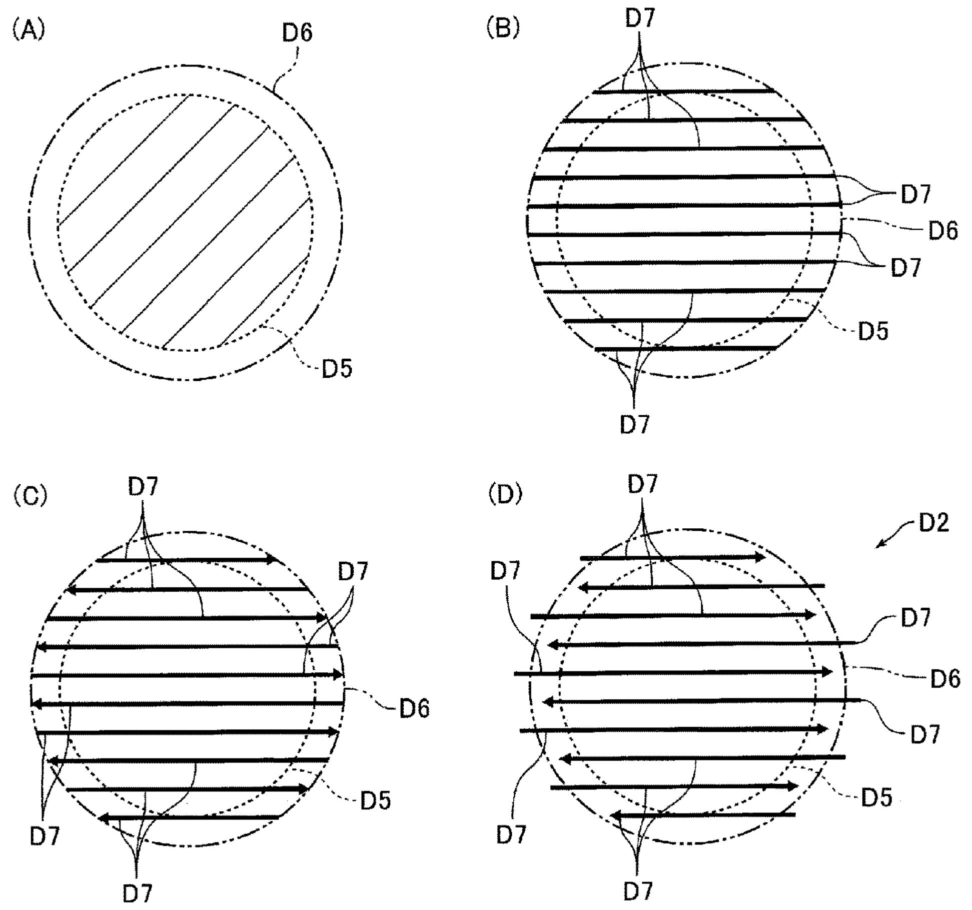
FIG. 7 is a view for illustrating a method for creating application data in the host control device illustrated in FIG. 1.
Figure 8:
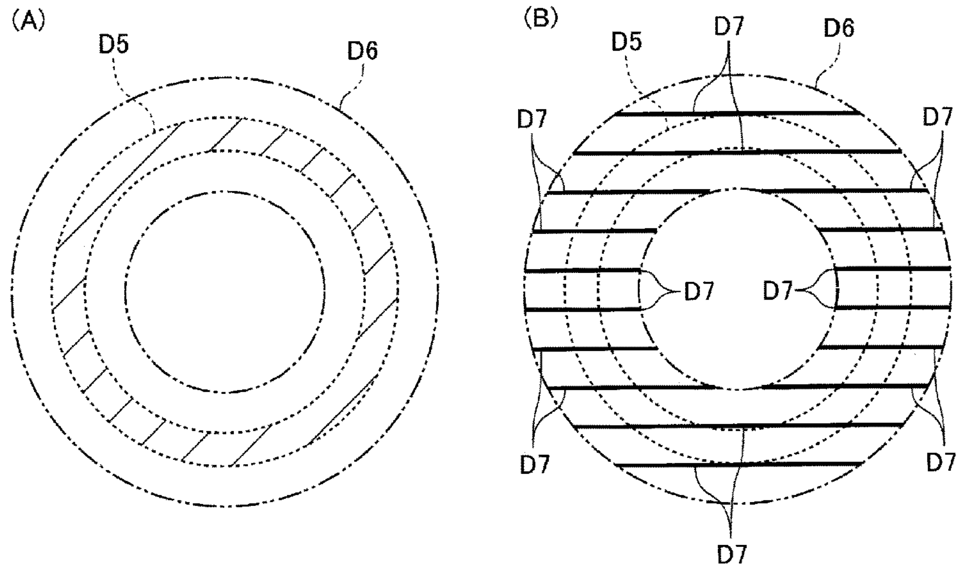
FIG. 8 is a view for illustrating a method for creating application data in the host control device illustrated in FIG. 1.
Figure 9:
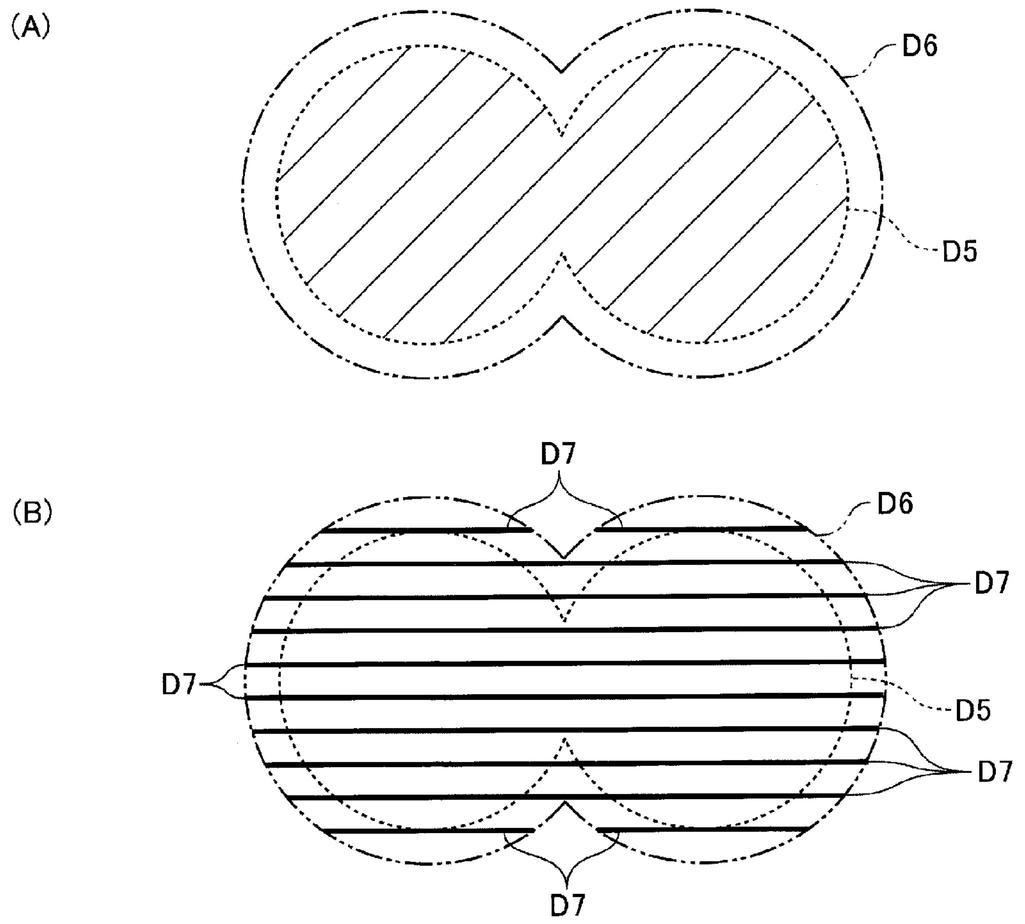
FIG. 9 is a view for illustrating a method for creating application data in the host control device illustrated in FIG. 1.

FIG. 4 is a view for illustrating that when the coating agent is applied by the coating device 3 illustrated in FIG. 2, a left-right direction misalignment occurs between the spray position of the coating agent from the nozzle 13 in the left-right direction and the application position of the coating agent to the base material 2 in the left-right direction. FIG. 5 is a view illustrating an example of display on a display 24 included in the PC 7 illustrated in FIG. 1. FIG. 6 is a view illustrating an example of an image F or the like printed on the base material 2 by the printing devices 4 illustrated in FIG. 1. FIGS. 7 to 9 are views for illustrating a creation method for application data D2 in the PC 7 illustrated in FIG. 1.

The PC 7 includes the display 24 such as a liquid crystal display (with reference to FIG. 5). The PC 7 is installed with image creation software for creating image data D1 being data of the image F to be printed on the base material 2 by the printing devices 4 (with reference to FIG. 6). Further, the PC 7 is installed with application and cutting software for creating application data D2 for applying the coating agent to the base material 2 by the coating device 3 (with reference to (D) of FIG. 7), and cutting data D3 for cutting the base material 2 by the cutting device 6.

In this embodiment, the position alignment marks M for performing the position alignment on the base material 2 in the coating device 3 and the cutting device 6 (with reference to FIG. 6) are printed on the base material 2 by the printing devices 4. Position alignment data D4 being data of the position alignment marks M are created by using the application and cutting software. Further, the PC 7 is installed with software (a printer driver) for controlling the printing devices 4, software for controlling the coating device 3, and software for controlling the cutting device 6.

The PC 7 is stored (registered) in advance with the type of the coating agent to be applied to the base material 2, properties of the base material 2, the type of the nozzle 13, the thickness (the film thickness) of the coating layer to be formed on the base material 2, and the distance between the upper face of the base material 2 to be placed on the table 12 and the lower end face of the nozzle 13 in the up-down direction as the database, and these pieces of information can be selected in the PC 7. The user selects these pieces of information while checking the display on the display 24 by using the application and cutting software. Further, the PC 7 can be input with the thickness of the base material 2 and a coating offset value for enlarging or narrowing an application range of the coating agent to the base material 2. The user inputs the thickness of the base material 2 and the coating offset value while checking the display on the display 24 by using the application and cutting software.

As described above, in a case where the moving speed of the nozzle 13 in the left-right direction becomes constant, the nozzle 13 starts to spray the coating agent, and the coating agent is sprayed from the nozzle 13 that moves in the left-right direction at a constant speed. Therefore, as illustrated in FIG. 4, a left-right direction misalignment ΔY occurs between the spray position of the coating agent from the nozzle 13 in the left-right direction, and the application position of the coating agent to the base material 2 in the left-right direction. The PC 7 can be input with an application misalignment correction value for correcting the left-right direction misalignment ΔY between the spray position of the coating agent from the nozzle 13 in the left-right direction and the application position of the coating agent to the base material 2 in the left-right direction. The user inputs the application misalignment correction value while checking the display on the display 24 by using the application and cutting software. Note that, the misalignment ΔY is measured in advance by performing test application of the coating agent to the base material 2 in the coating device 3. Further, the application misalignment correction value is, for example, a value that is half of the misalignment ΔY.

In the PC 7, the user creates the image data D1 while checking the display on the display 24 by using the image creation software, and causes the image data D1 created to be read on the application and cutting software. The application data D2 and the cutting data D3 are automatically created on the application and cutting software based on the image data D1. In other words, the PC 7 creates the application data D2 and the cutting data D3 based on the image data D1. Further, the position alignment data D4 are automatically created on the application and cutting software based on, for example, the cutting data D3. However, the user may create the position alignment data D4 while checking the display on the display 24 by using the image creation software or the application and cutting software.

Further, the PC 7 creates printing data for performing the printing on the base material 2 by the printing devices 4 based on the image data D1 and the position alignment data D4. The printing data are automatically created, for example, as the user performs a predetermined operation on the application and cutting software. Further, for example, as the user performs the predetermined operation on the application and cutting software, the printing data are transferred from the PC 7 to the printing devices 4, and the printing devices 4 print the image F and the position alignment marks M on the base material 2 as illustrated in FIG. 6. The position alignment marks M of this embodiment are outlined circles. The position alignment marks M are printed at four locations to surround the image F, and in a case where four position alignment marks M are sequentially connected by a straight line in a circumferential direction of the image F, a rectangular frame is formed.

As illustrated in FIG. 5, the cutting data D3 is frame-shaped data surrounding the image data D1. In a case where the user inputs a predetermined cutting offset value on the application and cutting software, the cutting data D3 is automatically created on the application and cutting software based on the image data D1. Further, application range temporary setting data D5 for temporarily setting an application range of the coating agent to the base material 2 is automatically created on the application and cutting software together with the cutting data D3. The application range temporary setting data D5 of this embodiment is the same data as the cutting data D3, and automatically created on the application and cutting software based on the image data D1 as the user inputs the cutting offset value on the application and cutting software. Note that, in FIGS. 7 to 9, an outer shape of the application range temporary setting data D5 is a simplified shape.

The application data D2 is automatically created on the application and cutting software, based on the application range temporary setting data D5, the type of coating agent, the properties of the base material 2, the type of the nozzle 13, the thickness of the coating layer to be formed on the base material 2, the distance between the upper face of the base material 2 to be placed on the table 12 and the lower end face of the nozzle 13 in the up-down direction selected in advance; and the thickness of the base material 2, the coating offset value, and the application misalignment correction value input in advance.

In other words, the PC 7 creates the application data D2, based on the application range temporary setting data D5, the type of coating agent, the properties of the base material 2, the type of the nozzle 13, the thickness of the coating layer to be formed on the base material 2, and the distance between the upper face of the base material 2 to be placed on the table 12 and the lower end face of the nozzle 13 in the up-down direction selected in advance; and the thickness of the base material 2, the coating offset value, and the application misalignment correction value input in advance. Further, as described above, since the application range temporary setting data D5 is the same data as the cutting data D3, the PC 7 creates the application data D2 based on the cutting data D3.

Specifically, the PC 7 first creates application range setting data D6 for setting the application range of the coating agent to the base material 2 based on the application range temporary setting data D5 and the coating offset value (with reference to (A) of FIG. 7, (A) of FIG. 8, and (A) of FIG. 9). In this embodiment, in order to reliably protect the image F printed on the base material 2 with the coating agent, the PC 7 creates the application range setting data D6 to make the application range of the coating agent to the base material 2 wider than the application range temporarily set in the application range temporary setting data D5 by the coating offset value.

For example, in a case where the outer shape of the application range temporary setting data D5 is a shape (a shape of a part indicated by an oblique line) as illustrated in (A) of FIG. 7 and (A) of FIG. 9, the application range setting data D6 are frame-shaped data surrounding the application range temporary setting data D5. Further, for example, as illustrated in (A) of FIG. 8, in a case where the outer shape of the application range temporary setting data D5 is annular, the application range setting data D6 is annular data having a larger outer diameter and a smaller inner diameter than that of the application range temporary setting data D5. Note that, the coating offset value is, for example, a value that is half of the application interval of the linear coating agents.

Thereafter, the PC 7 creates a plurality of pieces of linear line data (hatching lines) D7 in a region to be specified by the application range setting data D6 at a predetermined interval to be specified based on, for example, the various pieces of information described above selected in advance in the PC 7, and the thickness of the base material 2 input in advance in the PC 7 (with reference to (B) of FIG. 7, (B) of FIG. 8, and (B) of FIG. 9). The line data D7 are data corresponding to the linear coating agents. An interval of the line data D7 corresponds to the application interval of the linear coating agents in the front-back direction. The interval of the line data D7 is determined depending on, for example, the width of the each of the linear coating agents in the front-back direction to be specified based on, for example, the various pieces of information selected in advance in the PC 7, and the thickness of the base material 2 input in advance in the PC 7.

Thereafter, the PC 7 optimizes a locus of the line data D7 in order to minimize a moving amount of the nozzle 13 (with reference to (C) of FIG. 7). Specifically, the line data D7 are set as optimum vector data to minimize the moving amount of the nozzle 13. More specifically, the line data D7 are converted into vector data to make orientations of the vectors of the line data D7 that are adjacent to each other in a direction orthogonal to longitudinal directions of the line data D7 become orientations that are opposite to each other. Thereafter, the PC 7 moves the line data D7 in the longitudinal direction of the line data D7 by an amount depending on the application misalignment correction value input in advance to the PC 7 (with reference to (D) of FIG. 7). Specifically, the line data D7 as the vector data are moved to opposite sides to the orientations of the vectors.

In a case where the line data D7 are moved, the creation of the application data D2 ends. The application data D2 includes the plurality of the line data D7 after being moved. The application data D2 created in such manner includes spray range data of the coating agent from the nozzle 13 in the left-right direction for applying the linear coating agents to the base material 2, and application interval data of the linear coating agents in the front-back direction.

Manufacturing Method for Product in Manufacturing System

In the manufacturing system 1, as described above, the printing devices 4 print the image F and the position alignment marks M on the base material 2, for example, in a case where the user performs the predetermined operation on the application and cutting software, and the printing data are transferred from the PC 7 to the printing devices 4. Thereafter, the user carries the base material 2 on which the image F and the position alignment marks M are printed to the coating device 3 and places the base material on the table 12. Thereafter, the carriage 15 is moved to positions where the position alignment marks M are irradiated with light of the laser pointer mounted on the carriage 15, and the controller of the coating device 3 is caused to recognize the positions where the position alignment marks M are irradiated with the light of the laser pointer, and thus the controller of the coating device 3 is caused to recognize the positions of the base material 2 placed on the table 12 to perform the position alignment on the base material 2 on the table 12. In this embodiment, the controller of the coating device 3 is caused to recognize the positions at which one, two, or three position alignment marks M are irradiated with the light of the laser pointer.

Thereafter, the user performs the predetermined operation on the application and cutting software to transfer the application data D2 from the PC 7 to the coating device 3. As the application data D2 is transferred to the coating device 3, the coating device 3 applies the coating agent to the base material 2 based on the application data D2. Thereafter, the user carries the base material 2 to which the coating agent is applied to the curing device 5, disposes the base material 2 in the curing device 5, and cures the coating agent applied to the base material 2 by the curing device 5.

Thereafter, the user carries the base material 2 with the coating agent cured to the cutting device 6 and places the base material 2 on the table of the cutting device 6. Thereafter, by causing the detection mechanism of the cutting device 6 to detect the position alignment marks M, the controller of the cutting device 6 is caused to recognize the position of the base material 2 placed on the table to perform the position alignment on the base material 2 placed on the table of the cutting device 6. Thereafter, the user performs the predetermined operation on the application and cutting software to transfer the cutting data D3 from the PC 7 to the cutting device 6. As the cutting data D3 is transferred to the cutting device 6, the cutting device 6 cuts the base material 2 into a predetermined shape based on the cutting data D3.

Note that, in the coating device 3, the position alignment may be performed on the base material 2 to be placed on the table 12 by using a detection mechanism similar to the detection mechanism of the cutting device 6. Further, in the cutting device 6, the position alignment may be performed on the base material 2 placed on the table of the cutting device 6 by using a laser pointer similar to the laser pointer of the coating device 3.

Main Effects of this Embodiment

As described above, in this embodiment, the PC 7 automatically creates the application data D2 based on the image data D1. Therefore, in this embodiment, the user does not need to create the application data D2. Accordingly, in this embodiment, it is possible to simplify an operation of creating data for manufacturing a product in the manufacturing system 1 by the user. Further, in this embodiment, the PC 7 automatically creates the cutting data D3 based on the image data D1, and the user does not need to create the cutting data D3. Accordingly, in this embodiment, it is possible to simplify the operation of creating the data for manufacturing the product in the manufacturing system 1 by the user, even in a case where the base material 2 with the coating agent cured is cut by the cutting device 6.

In this embodiment, since the distance between the base material 2 and the nozzle 13 varies depending on the thickness of the base material 2, as the thickness of the base material 2 varies, the width of the each of the linear coating agents in the front-back direction may vary, and the application interval appropriate for the each of the linear coating agents in the front-back direction may vary. However, the PC 7 of this embodiment creates the application data D2 based on the thickness of the base material 2 and the image data D1 input to the PC 7. Therefore, in this embodiment, even when the thickness of the base material 2 changes, the application data D2 can be created in the PC 7 as appropriate.

In this embodiment, the width of the each of the linear coating agents in the front-back direction may vary depending on the type of the nozzle 13, and the application interval appropriate for the each of the linear coating agents in the front-back direction may vary, but the PC 7 of this embodiment creates the application data D2 based on the type of the nozzle 13 selected and the image data D1. Therefore, in this embodiment, even when the type of the nozzle 13 changes, the application data D2 can be created in the PC 7 as appropriate.

In this embodiment, the nozzle 13 starts to spray the coating agent when the moving speed of the carriage 15 in the left-right direction becomes constant. Therefore, in this embodiment, it is possible to suppress uneven thickness of the each of the linear coating agents applied in the left-right direction. Further, in this embodiment, since the nozzle 13 sprays the coating agent while moving in the left-right direction, as described above, the spray position of the coating agent from the nozzle 13 in the left-right direction and the application position of the coating agent to the base material 2 in the left-right direction are misaligned. However, the PC 7 of this embodiment creates the application data D2 based on the application misalignment correction value for correcting the misalignment between the spray position of the coating agent from the nozzle 13 in the left-right direction and the application position of the coating agent to the base material 2 in the left-right direction, and the image data D1. Therefore, in this embodiment, it is possible to suppress the misalignment of the application position of the each of the linear coating agents in the left-right direction.

In this embodiment, the printing devices 4 print the position alignment marks M on the base material 2. Therefore, in this embodiment, even when the printing devices 4, the coating device 3, and the cutting device 6 are separate devices, it is possible to perform the position alignment on the base material 2 in the coating device 3 and the cutting device 6 by using the position alignment marks M. Accordingly, in this embodiment, it is possible to suppress the misalignment among the printed part of the base material 2, a part of the base material 2 to which the coating agent to be applied, and a part of the base material 2 to be cut.

In this embodiment, the PC 7 creates the application data D2 based on the application range temporary setting data D5 as the same data as the cutting data D3. Therefore, in this embodiment, it is possible to simplify the data creation processing in the PC 7.

Other Embodiments

The embodiment described above is an example of a preferred embodiment of this invention, but is not limited thereto, and various deformations can be made in a range without changing the gist of this invention.

In the embodiment described above, the manufacturing system 1 may include one coating device 3 and one printing device 4. In other words, the number of the coating device 3 and the number of the printing devices 4 included in the manufacturing system 1 may be equal. Further, in the embodiment described above, the inkjet head that ejects the ink toward the base material 2 may be mounted on the carriage 15 of the coating device 3. In other words, the application mechanism that applies the coating agent to the base material 2 and the printing mechanisms that perform the printing on the base material 2 may be installed in the same device, and the application mechanism and the printing mechanisms may not be separate devices. In this case, the printing devices 4 become unnecessary.

Further, in the embodiment described above, the ultraviolet irradiator that irradiates the coating agent applied to the base material 2 with the ultraviolet ray may be mounted on the carriage 15. In this case, the curing device 5 becomes unnecessary. Moreover, in the embodiment described above, the laser light emitting section that emits the laser light toward the base material 2 may be mounted on the carriage 15. In this case, the cutting device 6 becomes unnecessary. Further, in the embodiment described above, in a case where it is unnecessary to cut the base material 2 with the coating agent cured into the predetermined shape, the manufacturing system 1 may not include the cutting device 6.

In the embodiment described above, the coating device 3 may apply the coating agent to the base material 2 before being printed by the printing devices 4. In other words, the printing devices 4 may perform the printing on the coating layer formed on the base material 2. In this case, the product manufactured by the manufacturing system 1 may be, for example, clothing such as a T-shirt. In this case, the base material 2 is made of fabric. Further, in this case, since the base material 2 with the coating agent cured is not cut, the manufacturing system 1 does not include the cutting device 6. Accordingly, the PC 7 does not create the cutting data D3.

Further, in this case, for example, the coating device 3 applies a white coating agent to the base material 2. In this case, the outer shape of the application range temporary setting data D5 is smaller than an outer shape of the image data D1 such that the white coating layer does not protrude from the image F printed by the printing devices 4. Further, the outer shape of the application range setting data D6 is, for example, smaller than the outer shape of the application range temporary setting data D5. In other words, the coating offset value is a negative value to narrow the application range of the coating agent to the base material 2.

In the embodiment described above, the nozzle 13 may be two or more mounted on the carriage 15. In this case, the nozzles 13 are two or more arranged in the front-back direction. Further, in the embodiment described above, the coating device 3 may apply a thermosetting coating agent to the base material 2. In this case, the curing device 5 includes a heating mechanism that heats the coating agent applied to the base material 2.

In the embodiment described above, the nozzle 13 may be the internal mixing two-fluid nozzle that internally mixes and sprays the coating agent and the compressed air. However, as in the embodiment described above, in a case where the nozzle 13 is the external mixing two-fluid nozzle, the scattering of the coating agent to be sprayed from the nozzle 13 is easily suppressed, and thus the coating agent in a certain amount can be applied to an intended position of the base material 2. Further, in the embodiment described above, the nozzle 13 may be a one-fluid nozzle that sprays only the coating agent. However, in a case where the nozzle 13 is the two-fluid nozzle, the coating layer having a relatively thin thickness can be formed on the base material 2.

In the embodiment described above, the front-back direction may be the first direction, and the left-right direction may be the second direction. In this case, the moving mechanism 21 is the second moving mechanism, and the moving mechanism 22 is the first moving mechanism. Further, in the embodiment described above, the type of the base material 2 to be used in the manufacturing system 1 may be one. Further, in the embodiment described above, the type of the coating agent to be used in the coating device 3 may be one, or the type of the nozzle 13 to be used in the coating device 3 may be one.

In the embodiment described above, the moving mechanism 22 may reciprocate the table 12 relative to the Y bar 16 in the front-back direction. Further, in the embodiment described above, the image data D1 may be created by a personal computer different from the PC 7 and read by the PC 7. Moreover, in the embodiment described above, the printing devices 4 may be printing devices other than the inkjet printers.

Second invention

Hereinafter, embodiments of this invention will be described with reference to drawings.

Schematic Configuration of Manufacturing System

Figure 10:
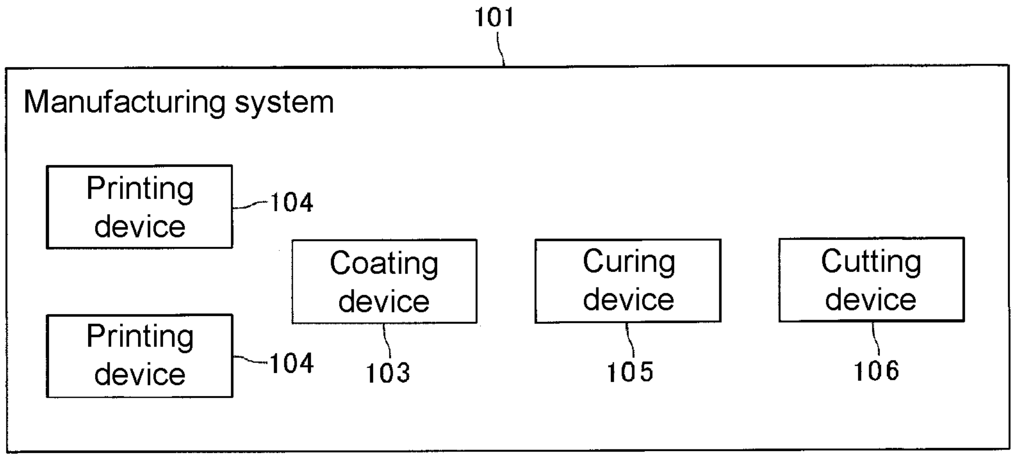
FIG. 10 is a block diagram of a manufacturing system according to one embodiment of this invention.

FIG. 10 is a block diagram of a manufacturing system 101 according to one embodiment of this invention.

Figure 12:
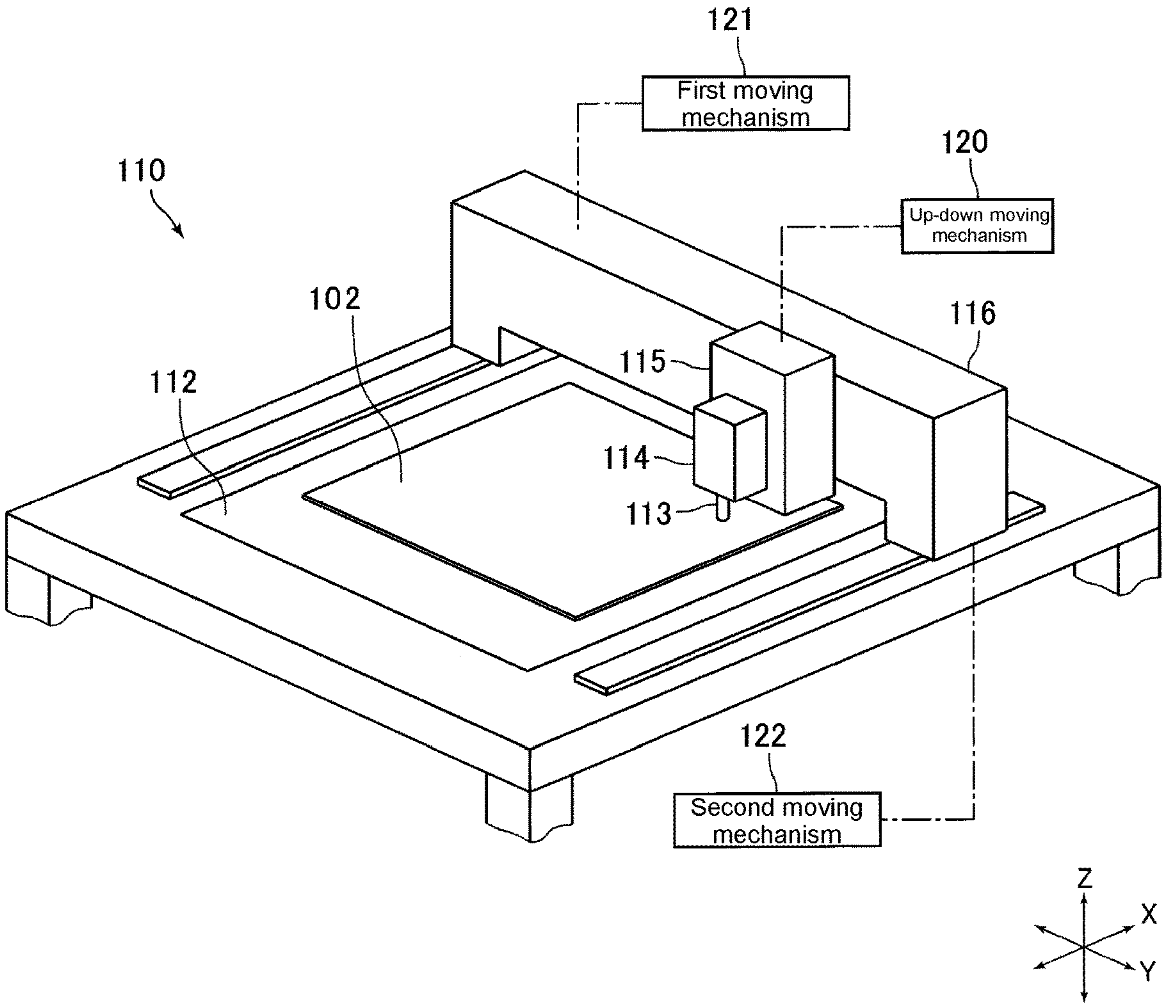
FIG. 12 is a view for illustrating a configuration of a coating device body of the coating device illustrated in FIG. 10.

The manufacturing system 101 of this embodiment is a system that manufactures a predetermined product by using a base material 102 (with reference to FIG. 12). In the manufacturing system 101, for example, a key holder plate to be used in a key holder is manufactured. The base material 102 is made of various materials such as resin, metal, glass, paper, or fabric. For example, the base material 102 is made of a resin such as an acrylic resin or an ABS resin. The manufacturing system 101 includes a coating device 103 that applies a coating agent to the base material 102, printing devices 104 that perform printing on the base material 102 with no coating agent applied, a curing device 105 that cures the coating agent applied to the base material 102, and a cutting device 106 that cuts the base material 102 with the coating agent cured into a predetermined shape.

The printing devices 104 are, for example, inkjet printers. In the printing devices 104, for example, the printing is performed on the base material 102 with an ultraviolet-curable ink. The cutting device 106 is, for example, a cutting plotter. The coating device 103 applies the coating agent on at least the printing performed on the base material 102 to protect the printing performed on the base material 102 by the printing devices 104. The coating agent is, for example, the ultraviolet-curable coating agent or the thermosetting coating agent.

In a case where the coating agent is the ultraviolet-curable coating agent, the curing device 105 includes an ultraviolet irradiator that irradiates the coating agent applied to the base material 102 with an ultraviolet ray. In a case where the coating agent is the thermosetting coating agent, the curing device 105 includes a heating mechanism that heats the coating agent applied to the base material 102. The coating agent cured by the curing device 105 becomes the coating layer. The thickness of the coating layer to be formed on the base material 102 is 10 to 40 μm. In this embodiment, the coating layer having a relatively high hardness is formed on the base material 102.

Time required for applying the coating agent to one base material 102 by one coating device 103 becomes less than or equal to half of time required for performing the printing on one base material 102 by one printing device 104. Therefore, for example, as illustrated in FIG. 1, the manufacturing system 101 of this embodiment includes two printing devices 104, one coating device 103, one curing device 105, and one cutting device 106. And the base material 102 on which the printing is performed by the two printing devices 104 is supplied to one coating device 103.

Configuration and Action of Coating Device

Figure 11:
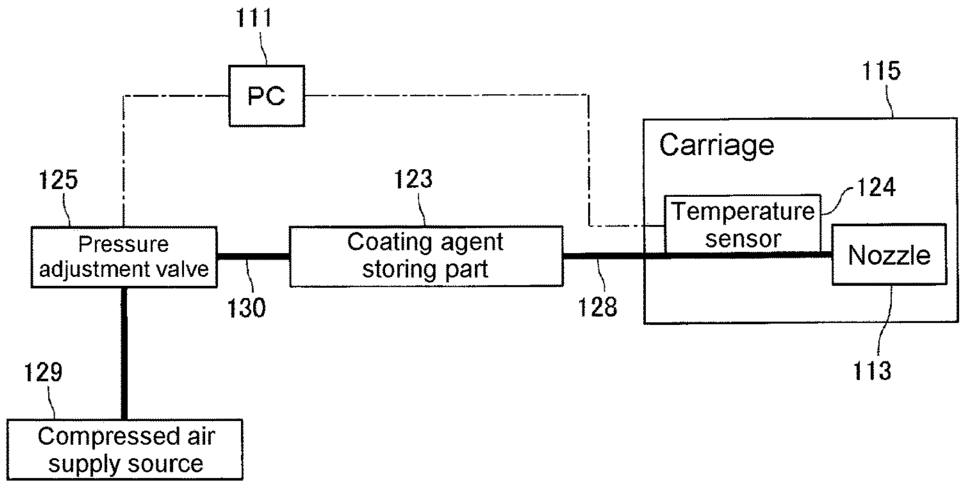
FIG. 11 is a block diagram for illustrating a configuration of a coating device illustrated in FIG. 10.
Figure 13:
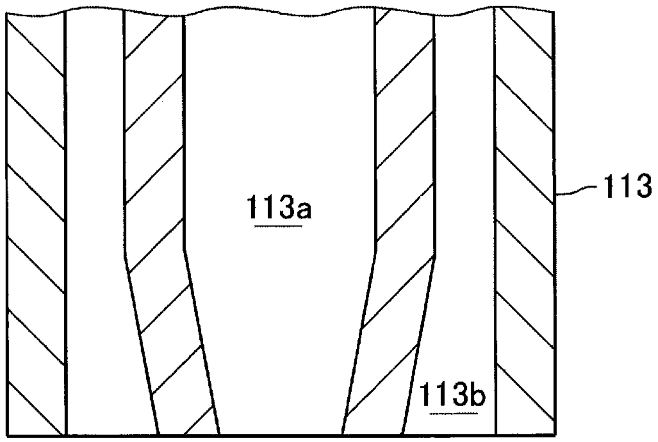
FIG. 13 is a cross-sectional view for illustrating a configuration of a nozzle illustrated in FIG. 12.
Figure 14:
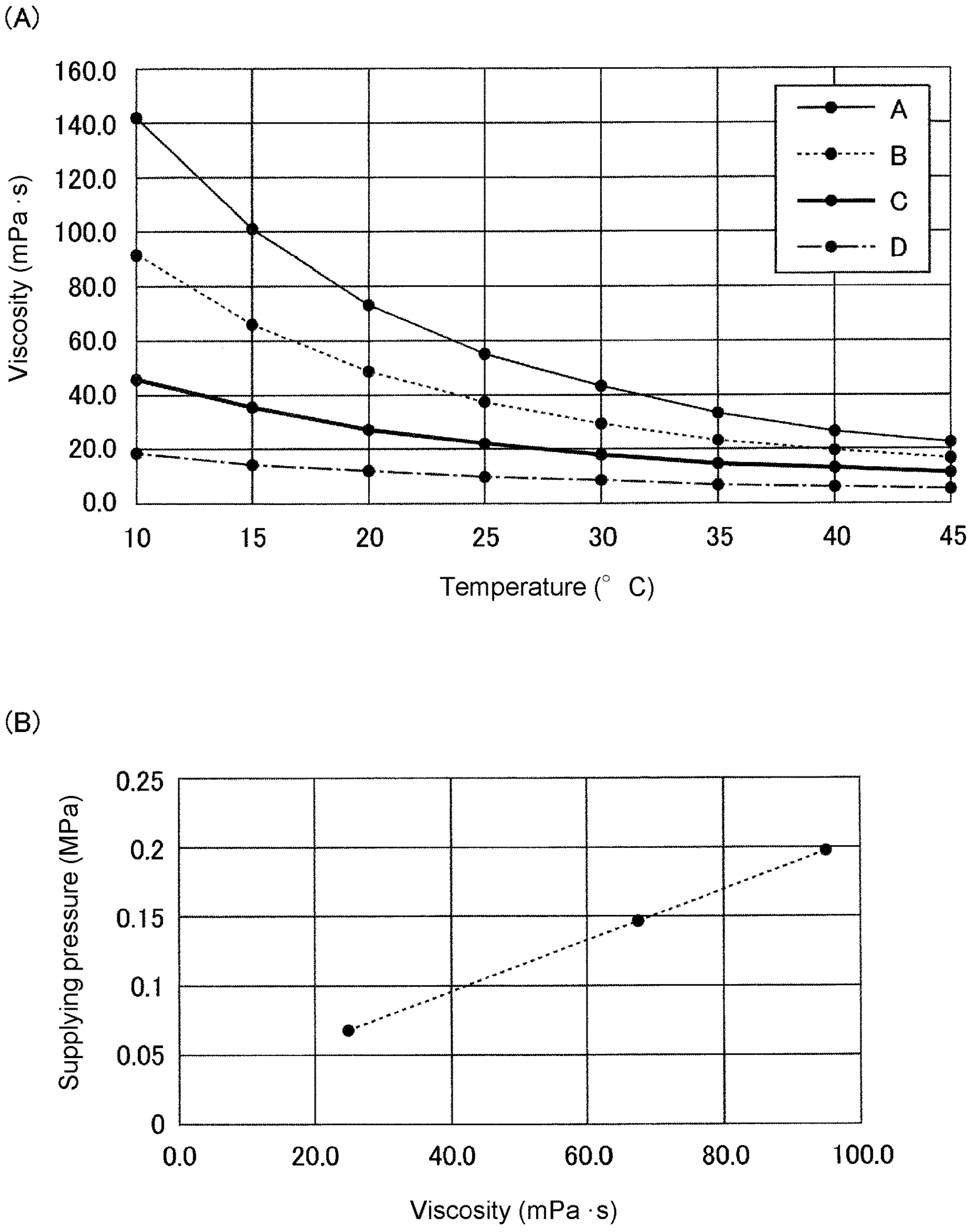
FIG. 14 is a view for illustrating a method for creating supplying pressure information to be stored in a PC illustrated in FIG. 11.
Figure 15:
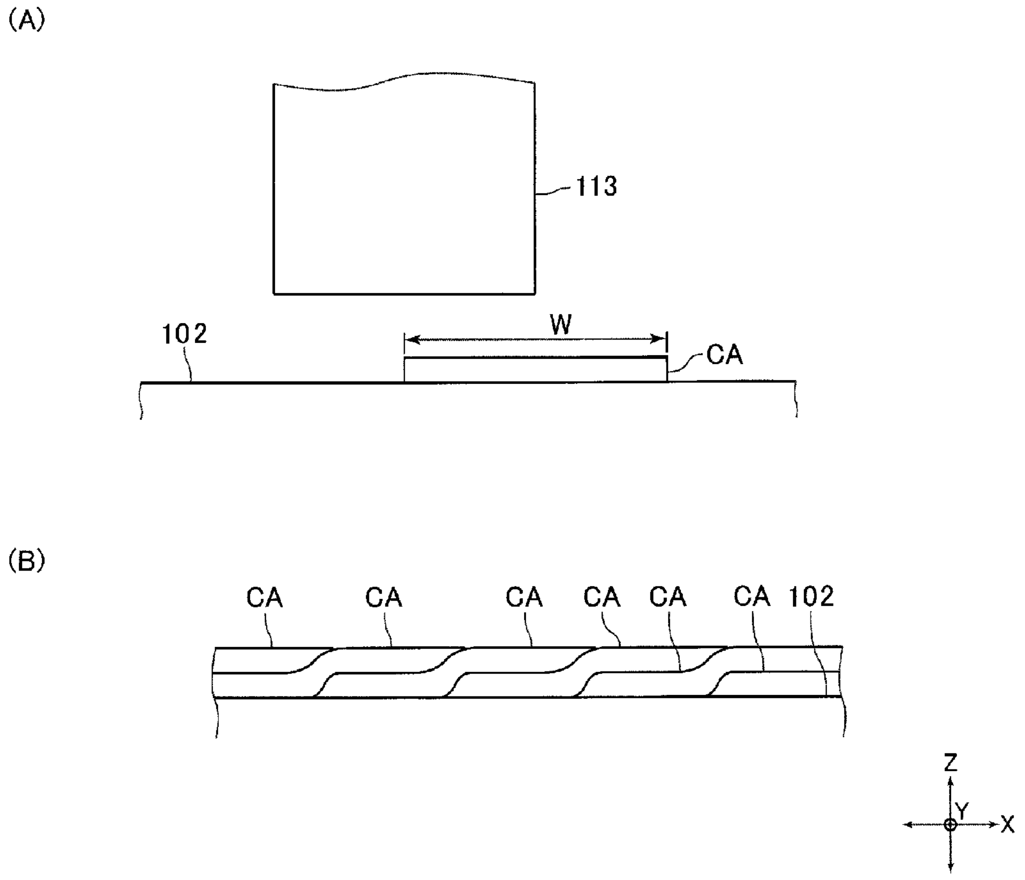
FIG. 15 is a view for illustrating an application method for a coating agent by the coating device illustrated in FIG. 10.

FIG. 11 is a block diagram for illustrating a configuration of the coating device 103 illustrated in FIG. 10. FIG. 12 is a view for illustrating a configuration of a coating device body 110 of the coating device 103 illustrated in FIG. 10. FIG. 13 is a cross-sectional view for illustrating a configuration of a nozzle 113 illustrated in FIG. 12. FIG. 14 is a view for illustrating a method for creating the supplying pressure information to be stored in a PC 111 illustrated in FIG. 11. FIG. 15 is a view for illustrating an application method for the coating agent by the coating device 103 illustrated in FIG. 10.

The coating device 103 includes the coating device body 110 and a personal computer (PC) 111 that controls the coating device body 110. The coating device body 110 includes a table 112 on which the base material 102 is placed, the nozzle 113 that sprays the coating agent toward the base material 102, an application head 114 to which the nozzle 113 is attached, a carriage 115 on which the nozzle 113 and the application head 114 are mounted, and a Y bar 116 as a carriage holding member that movably holds the carriage 115. The coating device 103 applies the coating agent to the base material 102 through a spray method for spraying the coating agent from the nozzle 113.

In descriptions below, a Y direction in FIG. 12, or the like orthogonal to an up-down direction (a vertical direction, a Z direction in FIG. 12 or the like) is made as a left-right direction, and an X direction in FIG. 12 or the like orthogonal to the up-down direction and the left-right direction is made as a front-back direction. Note that, the coating device body 110 includes a body side controller being a controller of the coating device body 110. The body side controller is electrically connected to the PC 111. The PC 111 is a host control device of the body side controller, and the body side controller controls the coating device body 110 based on a control command from the PC 111.

The application head 114 is held by a carriage 115 to be able to reciprocate in the up-down direction relative to the carriage 115. The Y bar 116 is formed in a substantially rectangular parallelepiped shape elongated in the left-right direction. The carriage 115 is held by the Y bar 116 to be able to reciprocate in the left-right direction relative to the Y bar 116. The nozzle 113, the application head 114, the carriage 115, and the Y bar 116 are disposed on an upper side of the table 112. The Y bar 116 is movable relative to the table 112 in the front-back direction.

The coating device body 110 includes an up-down moving mechanism 120 that moves the application head 114 up and down relative to the carriage 115, and a first moving mechanism 121 that reciprocates the carriage 115 relative to the Y bar 116 in the left-right direction. Further, the coating device 103 includes a second moving mechanism 122 that reciprocates the Y bar 116 relative to the table 112 in the front-back direction. The second moving mechanism 122 of this embodiment reciprocates the Y bar 116 relative to the table 112 in the front-back direction. The left-right direction (the Y direction) of this embodiment is the first direction being the predetermined direction orthogonal to the up-down direction, and the front-back direction (the X direction) is the second direction being the direction orthogonal to the up-down direction and the first direction.

Further, the coating device body 110 further includes a coating agent storing part 123 that stores the coating agent to be supplied to the nozzle 113, a temperature sensor 124 that detects a temperature of the coating agent to be supplied to the nozzle 113 from the coating agent storing part 123, and a pressure adjustment mechanism 125 that adjusts a supplying pressure of the coating agent to be supplied to the nozzle 113 from the coating agent storing part 123. The pressure adjustment mechanism 125 of this embodiment is a pressure adjustment valve. Accordingly, hereinafter, the pressure adjustment mechanism 125 is referred to as a "pressure adjustment valve 125".

The up-down moving mechanism 120 includes a drive source such as a motor, and a power transmission mechanism such as a ball screw that transmits power of the drive source to the application head 114. The first moving mechanism 121 includes a drive source such as a motor, and a power transmission mechanism such as a pulley and a belt transmitting power of the drive source to the carriage 115. The second moving mechanism 122 includes a drive source such as a motor, and a power transmission mechanism such as a ball screw that transmits power of the drive source to the Y bar 116.

The nozzle 113 is the external mixing two-fluid nozzle that externally mixes and sprays the coating agent and the compressed air. As illustrated in FIG. 13, a supply path 113*a* for the coating agent and a supply path 113*b* for the compressed air are formed inside the nozzle 113. The supply path 113*b* is formed in, for example, an annular shape surrounding the supply path 113*a*. A compressed air supply source (not illustrated) such as a compressor that supplies the compressed air is connected to the supply path 113*b*. The nozzle 113 is detachably attached to the application head 114. In this embodiment, as the nozzle 113, it is possible to use a round nozzle 113 with a spray port in a circular shape, or a flat nozzle 113 with a spray port in an oval shape or an elliptical shape. The nozzle 113 sprays the coating agent downward.

The coating agent storing part 123 is, for example, an ink bottle. The ink bottle is installed, for example, in an ink tank. Further, the coating agent storing part 123 may be the ink tank. The coating agent storing part 123 is disposed below the table 112. The viscosity of the coating agent in the coating agent storing part 123 is 15 to 150 mPa.

The temperature sensor 124 is mounted on the carriage 115. The temperature sensor 124 is attached to a pipe 128 connecting the nozzle 113 and the coating agent storing part 123. Further, the temperature sensor 124 is attached to, for example, a part of the pipe 128 to be disposed inside the application head 114. The temperature sensor 124 detects the temperature of the coating agent to be supplied to the nozzle 113 by detecting the temperature of the coating agent passing through the pipe 128.

The pressure adjustment valve 125 adjusts the supplying pressure of the coating agent to be supplied to the nozzle 113 from the coating agent storing part 123 by adjusting a pressure to be applied to the coating agent in the coating agent storing part 123. The pressure adjustment valve 125 is disposed in a middle of a pipe 130 connecting the coating agent storing part 123 and a compressed air supply source 129 such as a compressor that supplies the compressed air to the coating agent storing part 123. The pressure adjustment valve 125 of this embodiment is an electropneumatic regulator. The pressure adjustment valve 125 controls a pressure of the compressed air to be applied to the coating agent in the coating agent storing part 123 in response to an electric signal to be input to the pressure adjustment valve 125.

The temperature sensor 124 is electrically connected to the PC 111, and an output signal of the temperature sensor 124 is input to the PC 111. Further, the pressure adjustment valve 125 is electrically connected to the PC 111, and the PC 111 controls the pressure adjustment valve 125. In other words, the PC 111 outputs a control signal to the pressure adjustment valve 125. The PC 111 of this embodiment is a controller that receives the output signal of the temperature sensor 124 and controls the pressure adjustment valve 125.

An electromagnetic valve (not illustrated) is installed in a middle of the pipe 128. In a case where the electromagnetic valve is turned on, the coating agent is sprayed from the nozzle 113, and in a case where the electromagnetic valve is turned off, the spray of the coating agent from the nozzle 113 is stopped. Note that, the coating device body 110 includes a maintenance unit (not illustrated) for preventing blockage (clogging) of the nozzle 113. The maintenance unit is installed at a position out of an application region of the coating agent to the base material 102. The maintenance unit includes a capping mechanism that covers the spray port of the nozzle 113, and a coating agent receiving part that receives the coating agent discarded from the nozzle 113 before the coating agent is applied to the base material 102.

Here, the spray amount of the coating agent to be sprayed from the nozzle 113 per unit time varies depending on the viscosity of the coating agent to be sprayed from the nozzle 113 as long as the supplying pressure of the coating agent to the nozzle 113 is constant. Further, the viscosity of the coating agent sprayed from the nozzle 113 varies depending on the temperature of the coating agent sprayed from the nozzle 113. In other words, the spray amount of the coating agent to be sprayed from the nozzle 113 per unit time varies depending on the temperature of the coating agent to be sprayed from the nozzle 113 if the supplying pressure of the coating agent to the nozzle 113 is constant.

In this embodiment, the PC 111 stores the supplying pressure information in which the supplying pressure of the coating agent at which the spray amount of the coating agent from the nozzle 113 per unit time becomes constant is associated with each temperature. The supplying pressure information is created in advance based on experimental results. When the supplying pressure information is created, first, the viscosity of the coating agent to be used in the coating device 103 is measured depending on the temperatures thereof (with reference to (A) of FIG. 14). For example, the viscosity of each of four types of coating agents, that is, a coating agent A, a coating agent B, a coating agent C, and a coating agent D, is measured depending on temperatures thereof. Further, the supplying pressure of the coating agent at which the spray amount of the coating agent from the nozzle 113 per unit time becomes constant is measured depending on the viscosity of each of the coating agents (with reference to (B) of FIG. 14).

From these measurement results, the supplying pressure information is created in such a manner that the supplying pressure of the coating agent at which the spray amount of the coating agent from the nozzle 113 per unit time becomes constant is associated with the each temperature of the coating agent, and is stored in the PC 111. In the supplying pressure information, for example, the supplying pressure of the coating agent at which the spray amount of the coating agent from the nozzle 113 per unit time is 2 (ml/min) is associated with the each temperature. Further, in this embodiment, the supplying pressure of the coating agent included in the supplying pressure information is 0.05 to 0.4 MPa.

The PC 111 stores the supplying pressure information for the each type of the coating agent to be used in the coating device 103. For example, the PC 111 stores supplying pressure information of the coating agent A, supplying pressure information of the coating agent B, supplying pressure information of the coating agent C, and supplying pressure information of the coating agent D. Further, the PC 111 stores the supplying pressure information for each type of the base material 102 to be used in the coating device 103. Specifically, for example, in a case where the base material 102 made of an acrylic resin and the base material 102 made of an ABS resin are used as the base material 102, the PC 111 stores the supplying pressure information of each of the coating agents A to D in a case where the base material 102 is made of the acrylic resin, and the supplying pressure information of the each of the coating agents A to D in the case where the base material 102 is made of the ABS resin.

Moreover, the PC 111 stores the supplying pressure information for each type of the nozzle 113 to be used in the coating device 103. Specifically, the PC 111 stores, for example, the supplying pressure information of the each of the coating agents A to D in a case where the round nozzle 113 is used and in the case where the base material 102 is made of the acrylic resin, the supplying pressure information of the each of the coating agents A to D in a case where the round nozzle 113 is used and in the case where the base material 102 is made of the ABS resin, the supplying pressure information of the each of the coating agents A to D in a case where the flat nozzle 113 is used and in the case where the base material 102 is made of the acrylic resin, and the supplying pressure information of the each of the coating agents A to D in the case where the flat nozzle 113 is used and in the case where the base material 102 is made of the ABS resin.

Before the coating agent is applied to the base material 102 by the coating device 103, an operator of the coating device 103 sets the type of the coating agent, the type of the base material 102, and the type of the nozzle 113 in the PC 111. When the coating agent is applied to the base material 102 by the coating device 103, the PC 111 controls the pressure adjustment valve 125, based on the supplying pressure information depending on the type of the coating agent, the type of the base material 102, and the type of the nozzle 113 set by the operator and the temperature of the coating agent to be detected by the temperature sensor 124 to make the supplying pressure of the coating agent to be supplied to the nozzle 113 from the coating agent storing part 123 become a supplying pressure at which the spray amount of the coating agent from the nozzle 113 per unit time becomes constant.

In other words, the PC 111 generates a control signal to make the supplying pressure of the coating agent to be supplied to the nozzle 113 from the coating agent storing part 123 become the supplying pressure at which the spray amount of the coating agent from the nozzle 113 per unit time becomes constant based on the temperature of the coating agent to be detected by the temperature sensor 124 and the supplying pressure information depending on the type of the coating agent or the like set by the operator, and outputs the control signal to the pressure adjustment valve 125.

In the coating device 103, in a case where the nozzle 113 that sprays the coating agent moves once in the left-right direction together with the carriage 115, a strip-shaped coating agent CA being the coating agent in a strip shape elongated in the left-right direction (with reference to (A) of FIG. 15) is applied to the base material 102. The strip-shaped coating agent CA is applied at a position misaligned from the strip-shaped coating agent CA applied immediately before by less than a width W of the strip-shaped coating agent CA in the front-back direction (with reference to (A) of FIG. 15). In other words, before next strip-shaped coating agent CA is applied to the base material 102, the second moving mechanism 122 moves the Y bar 116 relative to the table 112 in the front-back direction by a distance shorter than the width W of the strip-shaped coating agent CA in the front-back direction.

In this embodiment, the strip-shaped coating agent CA is applied at a position misaligned by substantially half of the width W of the strip-shaped coating agent CA in the front-back direction relative to the strip-shaped coating agent CA applied immediately before. In other words, before the next strip-shaped coating agent CA is applied to the base material 102, the second moving mechanism 122 moves the Y bar 116 relative to the table 112 in the front-back direction by a distance substantially half of the width W of the strip-shaped coating agent CA in the front-back direction. Therefore, for example, as illustrated in (B) of FIG. 15, the strip-shaped coating agent CA is applied to the base material 102 to make substantially half of the strip-shaped coating agent CA overlap with adjacent strip-shaped coating agent in the front-back direction. The surface of the coating agent applied to the base material 102 in such manner gradually becomes flat with a lapse of time due to a self-leveling action of the coating agent.

Main Effects of this Embodiment

As described above, in this embodiment, the PC 111 stores the supplying pressure information in which the supplying pressure of the coating agent is associated with the each temperature to make the spray amount of the coating agent from the nozzle 113 per unit time constant even under different temperatures. Further, in this embodiment, the PC 111 controls the pressure adjustment valve 125 to make the supplying pressure of the coating agent to be supplied to the nozzle 113 from the coating agent storing part 123 the supplying pressure at which the spray amount of the coating agent from the nozzle 113 per unit time becomes constant based on the temperature of the coating agent to be detected by the temperature sensor 124 and the supplying pressure information stored in the PC 111.

Therefore, in this embodiment, even when the temperature of the coating agent varies and the viscosity of the coating agent varies, it is possible to suppress the fluctuation of the spray amount of the coating agent to be sprayed from the nozzle 113 per unit time. Accordingly, in this embodiment, the moving speed of the carriage 115 to be moved by the first moving mechanism 121 is kept constant, and a distance (a gap) between a tip end (a lower end) of the nozzle 113 and the base material 102 is kept constant, and thus it is possible to form the coating layer on the base material 102 with a desired thickness while suppressing the uneven thickness of the coating layer to be formed by the coating agent applied even in a case where the coating agent is applied to the base material 102 through the spray method for spraying the coating agent from the nozzle 113. Further, in this embodiment, since the supplying pressure of the coating agent is automatically adjusted, it is possible to easily form the coating layer on the base material 102 with the desired thickness while suppressing the uneven thickness of the coating layer.

Note that, a flow rate sensor that detects a flow rate of the coating agent to be supplied to the nozzle 113 from the coating agent storing part 123 is installed, and the pressure adjustment valve 125 is controlled to make the supplying pressure at which the spray amount of the coating agent from the nozzle 113 per unit time becomes constant based on results detected by the flow rate sensor, and thus it is also possible to suppress the fluctuation of the spray amount of the coating agent to be sprayed from the nozzle 113 per unit time when the viscosity of the coating agent varies. However, since the flow rate sensor that detects the flow rate of the coating agent is very expensive, in this case, cost of the coating device 103 increases. In contrast, in this embodiment, it is possible to suppress the fluctuation of the spray amount of the coating agent to be sprayed from the nozzle 113 per unit time when the viscosity of the coating agent varies by using a relatively inexpensive temperature sensor 124, and thus the cost of the coating device 103 can be reduced.

In this embodiment, the PC 111 stores the supplying pressure information for the each type of the coating agent to be used in the coating device 103. Therefore, in this embodiment, even when the type of the coating agent to be used in the coating device 103 changes, the PC 111 can control the pressure adjustment valve 125 to make the supplying pressure of the coating agent to be supplied to the nozzle 113 from the coating agent storing part 123 the supplying pressure at which the spray amount of the coating agent from the nozzle 113 per unit time becomes constant based on the temperature of the coating agent to be detected by the temperature sensor 124 and the supplying pressure information depending on the type of the coating agent to be used in the coating device 103. Accordingly, in this embodiment, even when the type of the coating agent to be used in the coating device 103 changes, it is possible to form the coating layer on the base material 102 with the desired thickness while suppressing the uneven thickness of the coating layer.

Further, ease of spreading of the coating agent on the surface of the base material 102 may be different depending on the type of the base material 102, and in a case where the ease of the spreading of the coating agent on the surface of the base material 102 becomes different, it may be difficult to form the coating layer on the base material 102 with a desired thickness. However, in this embodiment, since the supplying pressure information is stored in the PC 111 for the each type of the base material 102, the PC 111 can control the pressure adjustment valve 125 based on the temperature of the coating agent to be detected by the temperature sensor 124 and the supplying pressure information depending on the type of the base material 102 on which the coating layer is formed. Accordingly, in this embodiment, even when the type of the base material 102 to be used in the coating device 103 changes, it is possible to form the coating layer on the base material 102 with the desired thickness.

Further, even when the supplying pressure of the coating agent to be supplied to the nozzle 113 is constant, the spray amount of the coating agent from the nozzle 113 per unit time may vary depending on the type of the nozzle 113, and in a case where the spray amount of the coating agent from the nozzle 113 per unit time varies, it may be difficult to form the coating layer on the base material 102 with the desired thickness. However, in this embodiment, since the supplying pressure information is stored in the PC 111 for the each type of the nozzle 113, the PC 111 can control the pressure adjustment valve 125 based on the temperature of the coating agent to be detected by the temperature sensor 124 and the supplying pressure information depending on the type of the nozzle 113. Accordingly, in this embodiment, even when the type of the nozzle 113 to be used in the coating device 103 changes, it is possible to form the coating layer on the base material 102 with the desired thickness.

In this embodiment, the temperature sensor 124 is mounted on the carriage 115 on which the nozzle 113 is mounted. Therefore, in this embodiment, it is possible to detect the temperature of the coating agent by the temperature sensor 124 at a position closer to the nozzle 113 that sprays the coating agent. Accordingly, in this embodiment, the PC 111 can control the pressure adjustment valve 125 based on the temperature of the coating agent to be detected at the position closer to the nozzle 113, and as a result, it is possible to effectively suppress the fluctuation of the spray amount of the coating agent to be sprayed from the nozzle 113 per unit time.

In this embodiment, the viscosity of the coating agent in the coating agent storing part 123 is 15 to 150 mPa·s, and the supplying pressure of the coating agent included in the supplying pressure information is 0.05 to 0.4 MPa. Therefore, according to the study of the inventors of this application, in this embodiment, the coating layer having the thickness of 10 to 40 μm can be formed on the base material 102. Further, according to the study of the inventors of this application, in a case where the thickness of the coating layer is 10 to 40 μm, it is possible to reduce occurrence frequency of cracks in the coating layer.

In this embodiment, before the next strip-shaped coating agent CA is applied to the base material 102, the second moving mechanism 122 moves the Y bar 116 relative to the table 112 in the front-back direction by the distance shorter than the width W of the strip-shaped coating agent CA in the front-back direction, and the strip-shaped coating agent CA is applied to the position misaligned by less than the width W of the strip-shaped coating agent CA in the front-back direction relative to the strip-shaped coating agent CA applied immediately before. Therefore, in this embodiment, it is possible to suppress the thickness of the coating layer to be thin at the boundary between the strip-shaped coating agent CA and the strip-shaped coating agent CA. Accordingly, in this embodiment, it is possible to effectively suppress the uneven thickness of the coating layer to be formed on the base material 102.

In particular, in this embodiment, before the next strip-shaped coating agent CA is applied to the base material 102, the second moving mechanism 122 moves the Y bar 116 relative to the table 112 in the front-back direction by the distance substantially half of the width W of the strip-shaped coating agent CA in the front-back direction, and the strip-shaped coating agent CA is applied to the position misaligned by substantially half of the width W of the strip-shaped coating agent CA in the front-back direction relative to the strip-shaped coating agent CA applied immediately before. Therefore, according to the study of the inventors of this application, in this embodiment, it is possible to more effectively suppress the uneven thickness of the coating layer to be formed on the base material 102.

In this embodiment, the nozzle 113 is the external mixing two-fluid nozzle that externally mixes and sprays the coating agent and the compressed air. Therefore, in this embodiment, a relatively thin coating layer having a thickness of 10 to 40 μm can be formed on the base material 102. Further, in this embodiment, since scattering of the coating agent to be sprayed from the nozzle 113 is easily suppressed as compared to a case where the nozzle 113 is the internal mixing two-fluid nozzle that internally mixes and sprays the coating agent and the compressed air, it is possible to apply a certain amount of the coating agent to an intended position on the base material 102. Accordingly, in this embodiment, it is possible to effectively suppress the uneven thickness of the coating layer to be formed on the base material 102.

Other Embodiments

The embodiment described above is an example of a preferred embodiment of this invention, but is not limited thereto, and various deformations can be made in a range without changing the gist of this invention.

Figure 16:
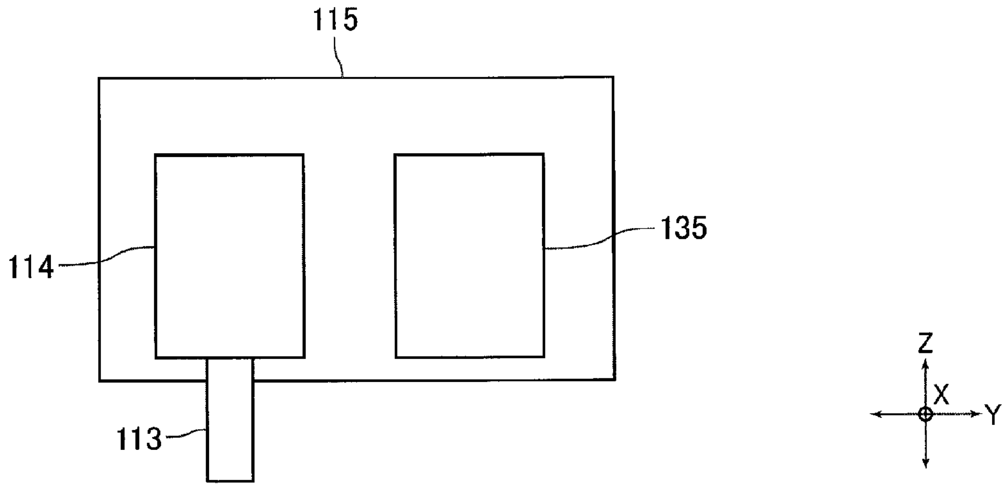
FIG. 16 is a view for illustrating a configuration of a coating device according to another embodiment of this invention.

In the embodiment described above, in the case where the coating agent is the ultraviolet-curable coating agent, as illustrated in FIG. 16, an ultraviolet irradiator 135 that irradiates the coating agent applied to the base material 102 with the ultraviolet ray may be mounted on the carriage 115 of the coating device 103. As illustrated in FIG. 16, the ultraviolet irradiator 135 may be mounted on the carriage 115 to be adjacent to the application head 114 in the left-right direction, or may be mounted on the carriage 115 to be adjacent to the application head 114 in the front-back direction. In this case, the curing device 105 becomes unnecessary. Further, in this case, for example, a cover that covers the ultraviolet irradiator 135 from below, and an opening and closing mechanism that opens and closes the cover are attached to the carriage 115. Further, in this case, the coating device 103 includes, for example, an up-down moving mechanism that moves the ultraviolet irradiator 135 up and down relative to the carriage 115.

In the embodiment described above, functions of the PC 111 may be incorporated in the body side controller being the controller of the coating device body 110, the output signal of the temperature sensor 124 may be input to the body side controller, and the body side controller may control the pressure adjustment valve 125. In this case, the body side controller is a controller that receives the output signal of the temperature sensor 124 and controls the pressure adjustment valve 125. Further, in this case, the supplying pressure information is stored in the body side controller, and the body side controller controls the pressure adjustment valve 125, based on the temperature of the coating agent to be detected by the temperature sensor 124 and the supplying pressure information, to make the supplying pressure of the coating agent to be supplied to the nozzle 113 from the coating agent storing part 123 become the supplying pressure at which the spray amount of the coating agent from the nozzle 113 per unit time becomes constant.

In the embodiment described above, an amount of misalignment of the next strip-shaped coating agent CA in the front-back direction relative to the strip-shaped coating agent CA applied immediately before may be less than half of the width W of the strip-shaped coating agent CA in the front-back direction, or may be more than half of the width W of the strip-shaped coating agent CA in the front-back direction. Further, in the embodiment described above, the coating device 103 may include a temperature sensor that detects a temperature in a room in which the coating device 103 is installed. Further, the coating device 103 may include a humidity sensor that detects humidity in the room in which the coating device 103 is installed. In a case where the ease of the spreading of the coating agent on the surface of the base material 102 varies depending on the humidity in the room in which the coating device 103 is installed, the PC 111 may use results detected by the humidity sensor when controlling the pressure adjustment valve 125.

In the embodiment described above, the nozzle 113 may be the internal mixing two-fluid nozzle that internally mixes and sprays the coating agent and the compressed air. Further, in a case where the thickness of the coating layer to be formed on the base material 102 may be relatively thick (for example, in a case where the thickness of the coating layer may be 50 μm), the nozzle 113 may be a one-fluid nozzle that sprays only the coating agent. Further, in the embodiment described above, the temperature sensor 124 may not be mounted on the carriage 115. In this case, the temperature sensor 124 may be, for example, installed in the coating agent storing part 123.

In the embodiment described above, the second moving mechanism 122 may reciprocate the table 112 relative to the Y bar 116 in the front-back direction. Further, in the embodiment described above, the type of the base material 102 to be used in the coating device 103 may be one, or the type of the coating agent to be used in the coating device 103 may be one. Further, the type of the nozzle 113 to be used in the coating device 103 may be one, or three or more.

In the embodiment described above, the supplying pressure of the coating agent may not be automatically adjusted. In other words, the pressure adjustment valve 125 may be manually adjusted. In this case, for example, the supplying pressure of the coating agent is displayed on a monitor of the PC 111 based on the temperature of the coating agent to be detected by the temperature sensor 124 and the supplying pressure information to be stored in the PC 111, and the operator of the coating device 103 adjusts the pressure adjustment valve 125 in the PC 111. Further, in a case where the pressure adjustment valve 125 is manually adjusted, the pressure adjustment valve 125 may be a manual adjustment valve instead of the electropneumatic regulator. In a case where the pressure adjustment valve 125 is the manual adjustment valve, the operator directly operates the pressure adjustment valve 125.

Further, in the case where the pressure adjustment valve 125 is manually adjusted, the supplying pressure information may not be stored in the PC 111. Even in this case, the supplying pressure information in which the supplying pressure of the coating agent at which the spray amount of the coating agent from the nozzle 113 per unit time becomes constant is associated with the each temperature is created based on the experimental results. In other words, even in this case, the supplying pressure information is specified in which the supplying pressure of the coating agent at which the spray amount of the coating agent from the nozzle 113 per unit time becomes constant is associated with the each temperature. Further, in this case, the operator of the coating device 103 adjusts the pressure adjustment valve 125 to make the supplying pressure of the coating agent to be supplied to the nozzle 113 from the coating agent storing part 123 the supplying pressure at which the spray amount of the coating agent from the nozzle 113 per unit time becomes constant based on the temperature of the coating agent to be detected by the temperature sensor 124 and the supplying pressure information.

Even in this case, it is possible to suppress the fluctuation of the spray amount of the coating agent to be sprayed from the nozzle 113 per unit time when the temperature of the coating agent varies and the viscosity of the coating agent varies, and thus it is possible to form the coating layer on the base material 102 with the desired thickness while suppressing the uneven thickness of the coating layer to be formed by the coating agent applied even in the case where the coating agent is applied to the base material 102 through the spray method for spraying the coating agent from the nozzle 113.

The invention claimed is:

1. A manufacturing system comprising:

printing mechanisms that perform printing on a base material;

an application mechanism that applies a coating agent to the base material; and a host control device that creates data for controlling the printing mechanisms and the application mechanism, wherein in a case where a predetermined direction orthogonal to an up-down direction is made as a first direction and a direction orthogonal to the up-down direction and the first direction is made as a second direction, the application mechanism includes a nozzle that sprays the coating agent toward the base material downward, a table on which the base material is placed, a carriage on which the nozzle is mounted, a first moving mechanism that reciprocates the carriage relative to the table in the first direction, and a second moving mechanism that reciprocates the carriage relative to the table in the second direction, as a moving speed of the carriage in the first direction becomes constant, the nozzle starts to spray the coating agent, as the nozzle that sprays the coating agent moves once relative to the table in the first direction by the first moving mechanism, a linear coating agent being the coating agent in a line shape with the first direction as a longitudinal direction is applied to the base material, and a coating layer is formed on the base material by a plurality of the linear coating agents to be applied at a certain interval in the second direction, the host control device creates application data for applying the coating agent to the base material by the application mechanism based on image data being data of an image to be printed on the base material by the printing mechanisms, the application data including, for applying the linear coating agents to the base material, spray range data of the coating agent from the nozzle in the first direction, and application interval data of the linear coating agents in the second direction, and each of the printing mechanisms and the application mechanism has a controller that is connected to the host control device.

2. The manufacturing system as set forth in claim 1, wherein the host control device is input with a thickness of the base material, and the host control device creates the application data based on the thickness of the base material and the image data input to the host control device.

3. The manufacturing system as set forth in claim 1, wherein a type of the nozzle is selectable in the host control device, and the host control device creates the application data based on the type of the nozzle selected and the image data.

4. The manufacturing system as set forth in claim 1, wherein the host control device is input with an application misalignment correction value for correcting a first direction misalignment between a spray position of the coating agent from the nozzle in the first direction and an application position of the coating agent to the base material in the first direction, and the host control device creates the application data based on the application misalignment correction value and the image data input to the host control device.

5. The manufacturing system as set forth in claim 1, wherein the printing mechanisms and the application mechanism are separate devices, and the number of the application mechanism is less than the number of the printing mechanisms.

6. The manufacturing system as set forth in claim 1, wherein the printing mechanisms and the application mechanism are separate devices, the application mechanism applies the coating agent to the base material after being printed by the printing mechanisms, and the printing mechanisms print position alignment marks for performing position alignment on the base material in the application mechanism on the base material.

7. The manufacturing system as set forth in claim 1, wherein the printing mechanisms perform the printing on the base material with a plurality of colors of ink, and the application mechanism applies the coating agent which is monochromatic or transparent to the base material.

8. The manufacturing system as set forth in claim 7, wherein the application mechanism applies the coating agent which is transparent to the base material.

9. The manufacturing system as set forth in claim 1, wherein the printing mechanisms perform the printing on the base material with an ultraviolet-curable ink, and the application mechanism applies the coating agent which is ultraviolet-curable to the base material.

10. The manufacturing system as set forth in claim 1, further comprising a cutting mechanism that cuts the base material with the coating agent cured into a predetermined shape, wherein the host control device creates cutting data for cutting the base material with the cutting mechanism based on the image data.

11. The manufacturing system as set forth in claim 10, wherein the host control device creates the application data based on the cutting data.

* * * * *